United States Patent
Lee et al.

(10) Patent No.: US 12,228,644 B2
(45) Date of Patent: Feb. 18, 2025

(54) METHOD FOR SENSING WEARING OF ELECTRONIC DEVICE AND ELECTRONIC DEVICE APPLIED THE SAME

(71) Applicant: Samsung Electronics Co., Ltd., Gyeonggi-do (KR)

(72) Inventors: Hyojung Lee, Gyeonggi-do (KR); Hyoseok Na, Gyeonggi-do (KR); Gunhee Park, Gyeonggi-do (KR); Myounggyo Seo, Gyeonggi-do (KR); Kyungtai Lee, Gyeonggi-do (KR); Hanyeop Lee, Gyeonggi-do (KR); Taihwan Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 17/988,004

(22) Filed: Nov. 16, 2022

(65) Prior Publication Data

US 2023/0152450 A1    May 18, 2023

Related U.S. Application Data

(63) Continuation of application No. PCT/KR2022/017889, filed on Nov. 14, 2022.

(30) Foreign Application Priority Data

Nov. 16, 2021  (KR) .................. 10-2021-0157648
Jan. 3, 2022  (KR) .................. 10-2022-0000545

(51) Int. Cl.
*G01S 17/04*       (2020.01)
*G01D 5/14*        (2006.01)
(Continued)

(52) U.S. Cl.
CPC ............... *G01S 17/04* (2020.01); *G01D 5/14* (2013.01); *G01D 5/24* (2013.01); *H02J 7/00712* (2020.01); *H04R 1/1025* (2013.01)

(58) Field of Classification Search
CPC .. G01S 17/04; G01D 5/14; G01D 5/24; H02J 7/00712; H02J 50/10; H04R 1/1025; H04R 1/1016; H04R 2420/07
See application file for complete search history.

(56) References Cited

U.S. PATENT DOCUMENTS 8,259,984 B2    9/2012   van der Bilt
9,843,853 B2    12/2017  Hirsch et al.
(Continued)

FOREIGN PATENT DOCUMENTS

CN    107065016 A    8/2017
CN    111970603 A    11/2020
(Continued)

OTHER PUBLICATIONS

International Search Report Dated Mar. 8, 2023.

*Primary Examiner* — Jermele M Hollington
*Assistant Examiner* — Zannatul Ferdous
(74) *Attorney, Agent, or Firm* — Cha & Reiter, LLC

(57) ABSTRACT

Disclosed is an electronic device including a housing, a memory, a first electrode and a second electrode disposed in the housing, a charging circuit configured to receive power from an external charging device, a first touch sensor, a magnetic sensor, a first switch, and a processor electrically connected to the memory, the charging circuit, the first touch sensor, the magnetic sensor, and the first switch, wherein the memory stores instructions that, when executed, cause the processor to sense a numerical value of a magnetic flux of a magnetic material contained in the external charging device via the magnetic sensor, and control the first switch to selectively connect the first electrode and the first touch (Continued)

sensor or the charging circuit to each other based on the numerical value of the magnetic flux. Other embodiments are also disclosed.

18 Claims, 19 Drawing Sheets

(51) Int. Cl.
*G01D 5/24* (2006.01)
*H02J 7/00* (2006.01)
*H04R 1/10* (2006.01)

(56) References Cited

U.S. PATENT DOCUMENTS

| | | | |
|---|---|---|---|
| 10,117,012 B2 | 10/2018 | Saulsbury et al. | |
| 10,117,014 B2 | 10/2018 | Hirsch et al. | |
| 10,397,688 B2 | 8/2019 | Hirsch et al. | |
| 10,971,938 B2 | 4/2021 | Park et al. | |
| 11,109,136 B2 | 8/2021 | Saulsbury et al. | |
| 11,115,748 B2 | 12/2021 | Wei | |
| 11,438,685 B2 | 9/2022 | Guo et al. | |
| 11,545,849 B2 | 1/2023 | Park et al. | |
| 2009/0003641 A1 | 1/2009 | Van Der Bilt | |
| 2014/0031895 A1* | 1/2014 | Rahimi | A61N 1/36021 607/46 |
| 2014/0225858 A1 | 8/2014 | Jo et al. | |
| 2016/0162007 A1 | 6/2016 | Kim et al. | |
| 2018/0109867 A1 | 4/2018 | Hirsch et al. | |
| 2018/0212449 A1* | 7/2018 | Park | H02J 7/00 |
| 2019/0073009 A1* | 3/2019 | Moon | H01M 10/045 |
| 2020/0235603 A1* | 7/2020 | Park | H02J 7/12 |
| 2020/0314527 A1 | 10/2020 | Guo et al. | |
| 2021/0014603 A1 | 1/2021 | Wei | |

FOREIGN PATENT DOCUMENTS

| | | |
|---|---|---|
| JP | 2020-108223 A | 7/2020 |
| KR | 10-2016-0069936 A | 6/2016 |
| KR | 10-2018-0088020 A | 8/2018 |
| KR | 10-2019-0036184 A | 4/2019 |
| KR | 10-2020-0075464 A | 6/2020 |
| KR | 10-2121185 B1 | 6/2020 |
| KR | 10-2189171 B1 | 12/2020 |

\* cited by examiner

METHOD FOR SENSING WEARING OF ELECTRONIC DEVICE AND ELECTRONIC DEVICE APPLIED THE SAME

CROSS-REFERENCE TO RELATED APPLICATION(S)

This application is a continuation of International Application No. PCT/KR2022/017889, which was filed on Nov. 14, 2022, and claims priority to Korean Patent Application Nos. 10-2021-0157648 and 10-2022-0000545, filed on Nov. 16, 2021 and Jan. 3, 2022, in the Korean Intellectual Property Office, respectively, the disclosure of which are incorporated by reference herein their entirety.

BACKGROUND

Technical Field

One or more embodiments disclosed herein generally relate to a method for sensing wearing of an electronic device and an electronic device to which the same is applied.

Description of Related Art

A wearable device may be in communication with an electronic device via Bluetooth technology. One such type of wearable devices is ear buds that may transmit and receive signals to and from the electronic device via Bluetooth technology and may output audio signals to user's ears.

The ear buds may determine whether the user is wearing the ear buds via a sensor. One example of the sensor is an infrared sensor. When it is recognized that the user is wearing the ear buds, acoustic or audio signals of the electronic device may be output to the user via the ear buds.

SUMMARY

Because whether a user is wearing ear buds is determined based on an infrared sensor, when an area around the infrared sensor is covered with a hand or an object, even though the user is not actually wearing the ear buds, it may be recognized that the user is wearing the ear buds. Accordingly, even when the user does not want audio signals to be output via the ear buds, the audio signal may still be output.

The ear buds may also be capable of performing noise cancelling. Because the noise canceling function operates based on whether at least one of the ear buds is worn, when it is erroneously recognized that the user is wearing the ear buds even though the user is not wearing the ear buds, the noise canceling function may malfunction.

Because the distance between an object and the ear buds recognized by the infrared sensor varies based on the ambient brightness, in a dark environment, it may be recognized that the user is wearing the ear buds even at a distance greater than a specified recognition di stance.

An electronic device disclosed in one embodiment of the disclosure may include a housing, a memory, a first electrode and a second electrode disposed in the housing, a charging circuit configured to receive power from an external charging device, a first touch sensor, a magnetic sensor, a first switch, and a processor electrically connected to the memory, the charging circuit, the first touch sensor, the magnetic sensor, and the first switch, and the memory may store instructions that, when executed, cause the processor to sense a numerical value of a magnetic flux of a magnetic material contained in the external charging device via the magnetic sensor, and control the first switch to selectively connect the first electrode and the first touch sensor or the charging circuit to each other based on the numerical value of the magnetic flux.

A method for controlling an electronic device according to one embodiment disclosed in the disclosure may include sensing a numerical value of a magnetic flux via a magnetic sensor, and controlling a first switch to selectively connect a first electrode and a first touch sensor or a charging circuit to each other based on the numerical value of the magnetic flux.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

In connection with description of the drawings, the same or similar reference numerals may be used for the same or similar components.

DETAILED DESCRIPTION

When the first touch sensor and/or the second touch sensor mentioned above are used to replace the infrared sensor or when sensing the object within the specified recognition distance of the ear buds using the first touch sensor, the second touch sensor, and/or the infrared sensor, the sensing accuracy may be increased compared to sensing the object using only the infrared sensor.

When the first touch sensor and/or the second touch sensor replace the infrared sensor, omission of the infrared sensor increases the usable internal space of the ear buds. In that way, the cost of manufacturing the ear buds may also be reduced because the infrared sensor may be omitted.

Hereinafter, certain embodiments of the disclosure will be described with reference to the accompanying drawings. However, this is not intended to limit the disclosure to specific embodiments, and it should be understood to include various modifications, equivalents, and/or alternatives of embodiments of the disclosure.

Figure 1:
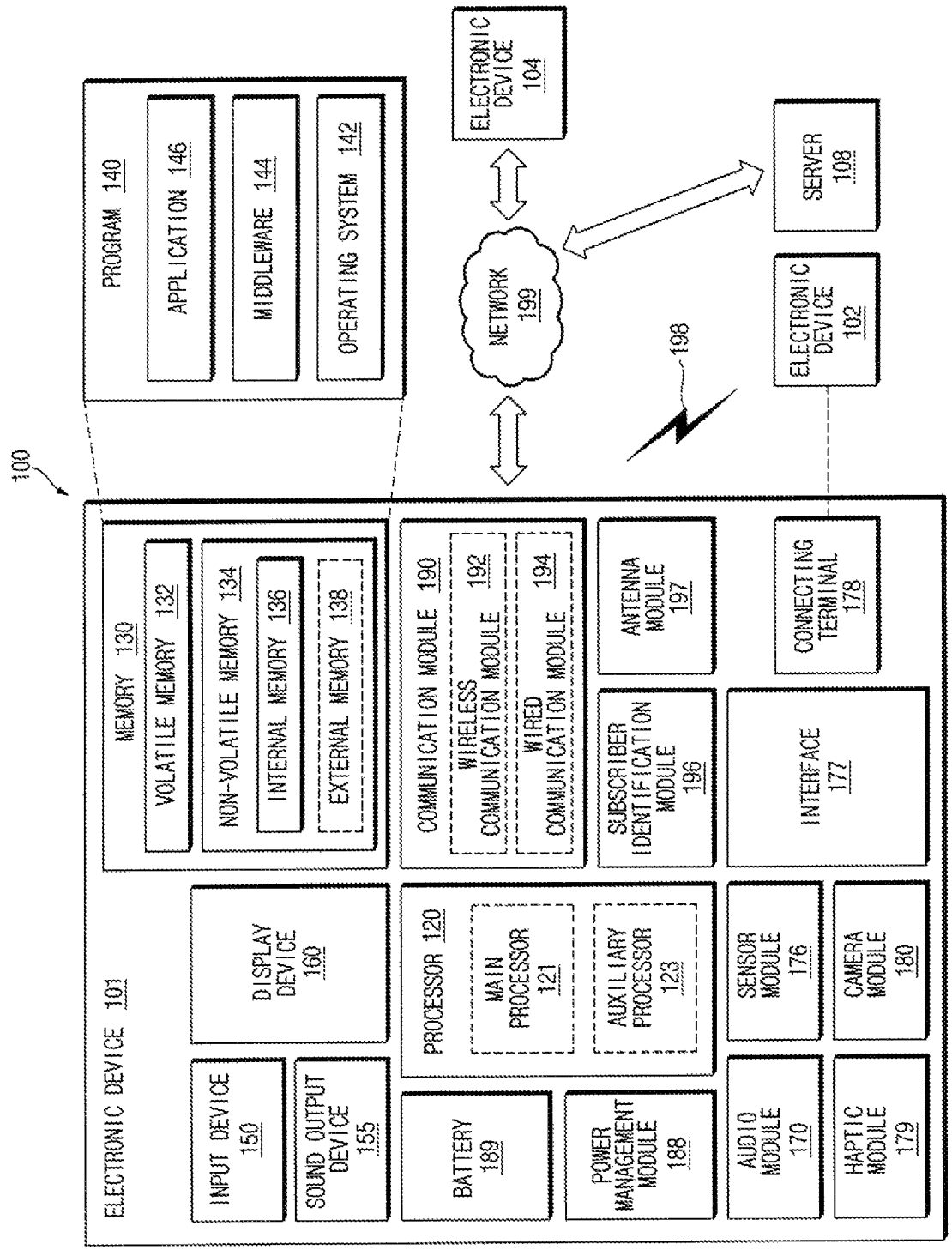
FIG. 1 is a block diagram of an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
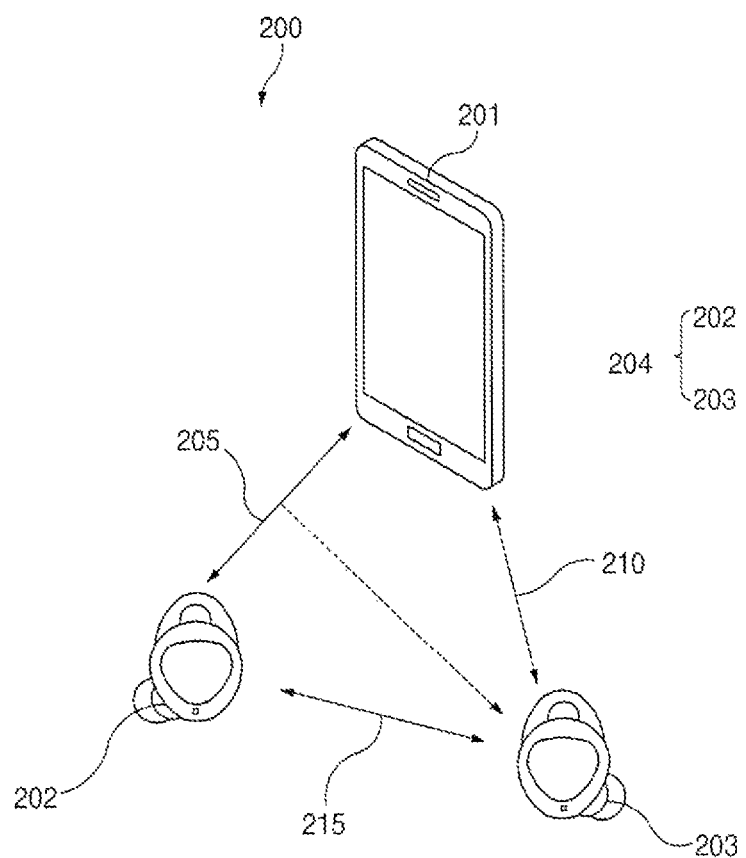
FIG. 2 shows a communication environment of a wireless audio device and an electronic device according to an embodiment of the disclosure.

FIG. 2 shows a communication environment 200 of a wireless audio device 204 and an electronic device 201 according to an embodiment of the disclosure.

The wireless audio device 204 may include a first wireless audio device 202 and/or a second wireless audio device 203. The electronic device 201 and the wireless audio device 204 may include at least some components that are the same as or similar to the components of the electronic device 101 shown in FIG. 1, and the at least some components may perform functions that are the same as or similar to those of the components of the electronic device 101. Hereinafter, the term "wireless audio device" may be referred to as the first wireless audio device 202, the second wireless audio device 203, or the first wireless audio device 202 and the second wireless audio device 203 collectively, unless otherwise described.

The electronic device 201 may be a user terminal such as a smartphone, a tablet, a desktop computer, or a laptop computer. The wireless audio device 204 may be wireless earphones, a headset, ear buds, or a speaker. However, the electronic device 201 and/or the wireless audio device 204 are not limited to the above-described examples. The wireless audio device 204 may include various types of devices (e.g., hearing aid or portable audio device) that receive audio signal(s) and output the received audio signal(s). The term "wireless audio device" is only used herein to distinguish it from the electronic device 201, and is not meant to be limiting. The "wireless audio device" may be referred to as a separate electronic device, wireless earphones, ear buds, a true wireless stereo (TWS), or an earset.

The electronic device 201 and the wireless audio device 204 may perform wireless communication while they are a short distance apart based on Bluetooth technology defined by the Bluetooth (Bluetooth™) special interest group (SIG). The Bluetooth network may include a Bluetooth legacy network or a BLE network. The electronic device 201 and the wireless audio device 204 may perform the wireless communication via one of the Bluetooth legacy network and the BLE networks or may perform the wireless communication via the two networks.

With respect to a link (e.g., first link 205 and/or second link 210) established between the electronic device 201 and the wireless audio device 204, the electronic device 201 may serve as a primary device (e.g., master device) and the wireless audio device 204 may serve as a secondary device (e.g., slave device). With respect to a link (e.g., third link 215) established between the first wireless audio device 202 and the second wireless audio device 203, one (e.g., the first wireless audio device 202) of the first wireless audio device 202 and the second wireless audio device 203 may serve as the primary device, and the other device (e.g., the second wireless audio device 203) may serve as the secondary device.

The second wireless audio device 203 may monitor the first link 205 using information related to the first link 205.

In another embodiment, the first wireless audio device 202 may monitor the second link 210 using information related to the second link 210.

Figure 3A:
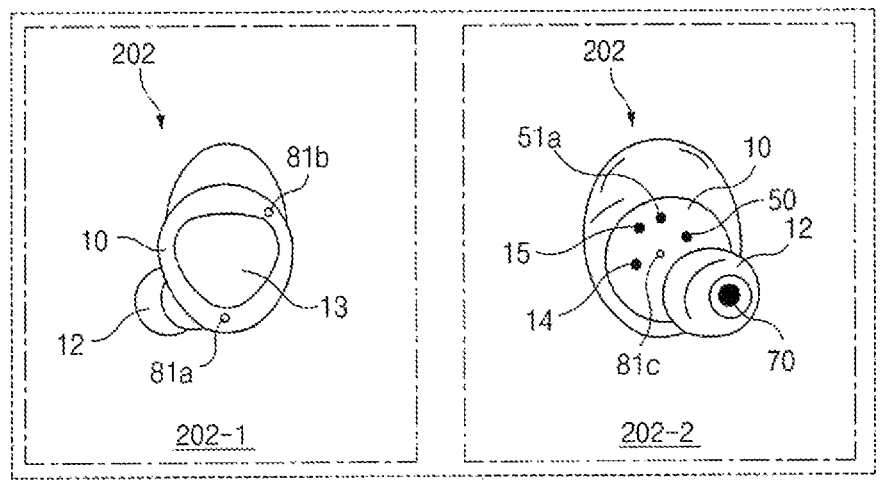
FIG. 3A shows a front view and a rear view of a first wireless audio device according to an embodiment of the disclosure.

FIG. 3A shows a front view 202-1 and a rear view 202-2 of the first wireless audio device 202 according to an embodiment of the disclosure.

Referring to FIG. 3A, the structure of the first wireless audio device 202 is described. For convenience of description, duplicate descriptions may be omitted. The second wireless audio device 203 in FIG. 2 may also have the same or similar structure as the first wireless audio device 202.

The reference numeral 202-1 shows the front view of the first wireless audio device 202. The first wireless audio device 202 may include a housing 10. The housing 10 may implement the exterior of the first wireless audio device 202. A touch pad 13 and a plurality of microphones 81*a* and 81*b* disposed on a first surface (e.g., the outwardly directed surface when the first wireless audio device is worn) of the housing 10 may be included. The touch pad 13 may be set to receive touch inputs or push inputs of the user.

The reference number 202-2 shows the rear view of the first wireless audio device 202. A first electrode 14, a second electrode 15, a proximity sensor 50, a third microphone 81*c*, and a speaker 70 disposed on a second surface (e.g., the surface directed toward the user when the first wireless audio device is worn) of the housing 10 may be included.

The speaker 70 may convert electrical signals into audio signals. The speaker 70 may output audio to the outside of the first wireless audio device 202, i.e., into the user's ear. The speaker 70 may convert the electric signals into the audio that the user may recognize aurally and output the audio. At least a portion of the speaker 70 may be disposed inside the housing 10. The speaker 70 may be coupled with an ear tip 12 via one end of the housing 10.

The ear tip 12 may be made of an elastic material (or flexible material). The ear tip 12 may assist the first wireless audio device 202 to be inserted in close contact with a user's ear. At least one area of the ear tip 12 may be deformed based on the shape of an external object (e.g., the shape of the user's ear canal). The ear tip 12 may be formed in a cylindrical shape with a hollow defined therein. When the ear tip 12 is coupled to the housing 10, the audio output from the speaker 70 may be transmitted to the external object (e.g., the user) via the hollow of the ear tip 12.

The first electrode 14 and the second electrode 15 may be connected to an external charging device and receive power from the external charging device. The external charging device may be a cradle for charging the first wireless audio device (e.g., the first wireless audio device 202 in FIG. 2) and the second wireless audio device (e.g., the second wireless audio device 203 in FIG. 2). The cradle may be a device constructed to charge the electronic device or to connect the electronic device to another device. The first wireless audio device 202 may determine whether the user is wearing the first wireless audio device 202 using the first electrode 14 and the second electrode 15. Specific details in which the first wireless audio device 202 determines whether the user is wearing the first wireless audio device 202 using the first electrode 14 and the second electrode 15 will be described later with reference to FIGS. 4A to 10B.

The first wireless audio device 202 may include a sensor 51*a* disposed on the second surface of the housing 10. The sensor 51*a* may be an acceleration sensor, a bone conduction sensor, and/or a gyro sensor, but these are merely examples, and the sensor 51*a* may include other sensors having other functions different from those of the above-described sensors. The position and shape of the sensor 51*a* shown in FIG. 3A are illustrative, and the disclosure is not limited thereto. The sensor 51*a* may be disposed inside the housing 10 and may not be exposed to the outside. The sensor 51*a* may be positioned so that it can be in contact with the user's ear or be positioned in one portion of the housing 10 in contact with the wearer's ear when the user is wearing the first wireless audio device 202.

A proximity sensor 50 may be used to sense the wearing state of the user. The proximity sensor 50 may be disposed inside the housing 10. The proximity sensor 50 may be disposed such that at least a portion thereof is exposed to the outside of the first wireless audio device 202. The first wireless audio device 202 may determine whether the first wireless audio device 202 is worn by the user based on data measured by the proximity sensor 50.

The proximity sensor 50 may include the infrared sensor. The infrared sensor may sense whether the housing 10 is in contact with the body of the user (e.g. ear), and the first wireless audio device 202 may determine whether the user is wearing the first wireless audio device 202 based on the sensing of the infrared sensor. The proximity sensor 50 may not be limited to the infrared sensor, and may be implemented using various other types of sensors (e.g., acceleration sensor or gyro sensor).

The third microphone 81*c* may be disposed to sense audio in a direction away from the user when the first wireless audio device 202 is worn. The third microphone 81*c* may be referred to as an internal microphone.

Figure 3B:
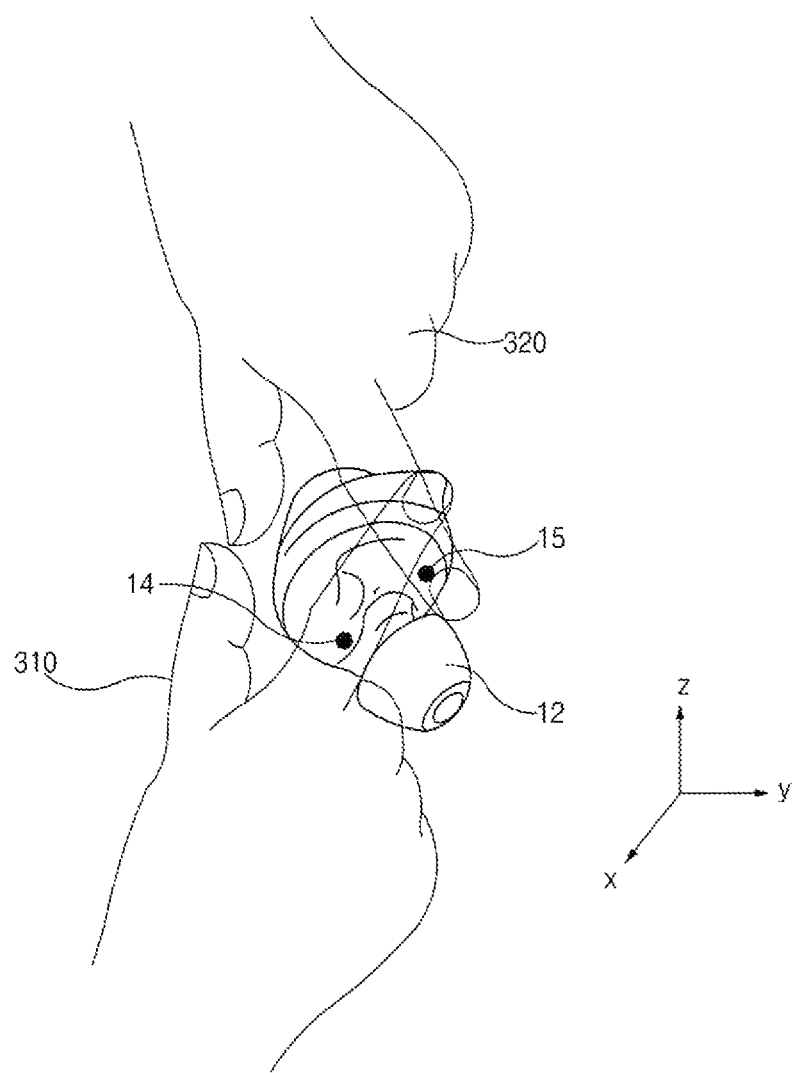
FIG. 3B shows an embodiment in which a user comes into contact with a first wireless audio device according to an embodiment of the disclosure.

FIG. 3B shows an embodiment in which the user comes into contact with a first wireless audio device (e.g., the first wireless audio device 202 in FIG. 2) according to an embodiment of the disclosure. Referring to FIG. 3B, the first electrode 14 and the second electrode 15 may be disposed to be exposed to the outside of the first wireless audio device 202. The first electrode 14 and the second electrode 15 may be disposed so that they are typically not simultaneously covered by the user's hands (e.g., 310 and 320).

For example, when the user covers the first electrode 14 using a first index finger of the first hand 310, the second electrode 15 may be disposed on the outside of the first wireless audio device 202 in the −z-axis direction of a straight line connecting the first electrode 14 and a first point. The first point may be a point where the first index finger and the ear tip 12 are in contact with each other. As another example, when the user covers the second electrode 15 using a second index finger of the second hand 320, the first electrode 14 may be disposed on the exterior of the first wireless audio device 202 in the −z-axis direction of a straight line connecting the second electrode 15 and a second point. The second point may be a point where the second index finger and the ear tip are in contact with each other.

Via the arrangement of the first electrode 14 and the second electrode 15 described above, the first wireless audio device 202 may be prevented from misrecognizing that the user is wearing the first wireless audio device 202. In the disclosure, it has been illustratively described that the first electrode 14 or the second electrode 15 of the first wireless audio device 202 are covered using the finger, but the description may be made by replacing the finger with any part of the user's body that may come into contact with the first electrode 14 and/or the second electrode 15 of the first wireless audio device 202.

Figure 4A:
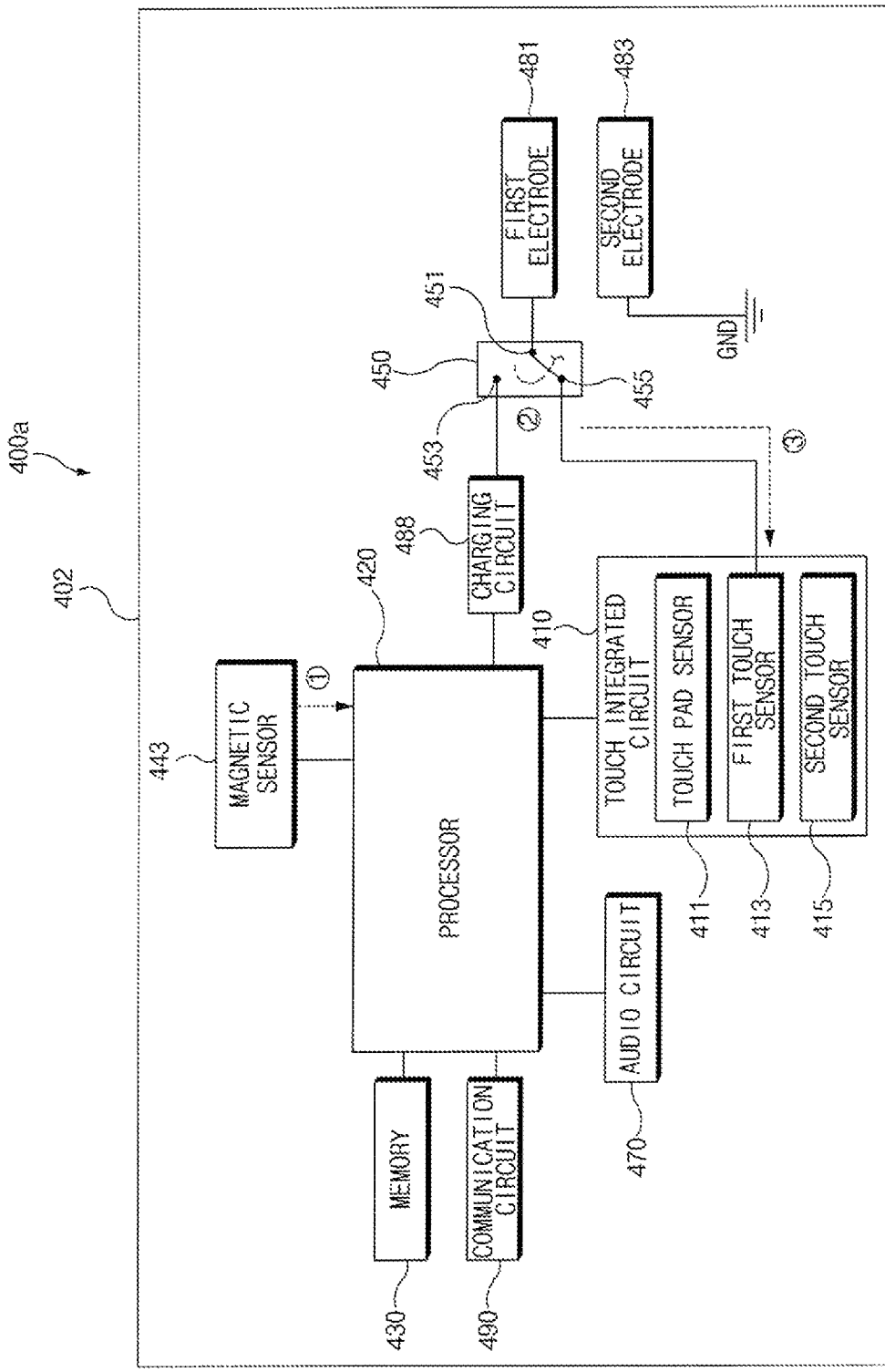
FIG. 4A is a block diagram of a first wireless audio device including a first switch according to an embodiment of the disclosure.

FIG. 4A is a block diagram 400*a* of a first wireless audio device including a first switch 450 according to an embodiment of the disclosure. Referring to FIG. 4A, a first wireless audio device 402 (e.g., the first wireless audio device 202 in FIG. 2) may include a processor 420 (e.g., the processor 120 in FIG. 1), a memory 430 (e.g., the memory 130 in FIG. 1), a communication circuit 490 (e.g., the communication module 190 in FIG. 1), an audio circuit 470 (e.g., the audio module 170 in FIG. 1), a charging circuit 488 (e.g., the power management module 188 in FIG. 1), a magnetic sensor 443, a touch integrated circuit 410, the first switch 450, a first electrode 481 (e.g., the first electrode 14 in FIG. 3A), and/or a second electrode 483 (e.g., the second electrode 15 in FIG. 3A). The second electrode may be electrically connected to the ground. The processor 420 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

The magnetic sensor 443 may perform functions substantially the same as or similar to that of the magnetic sensor included in the sensor module 176 in FIG. 1. The processor 420 may sense magnetic flux of a magnetic material contained in the external charging device via the magnetic sensor 443. The processor 420 may determine a state of the first wireless audio device 402 based on the numerical value of the magnetic flux of the sensed magnetic material.

For example, when the numerical value of the magnetic flux sensed via the magnetic sensor 443 is equal to or greater than a specified first magnetic flux, the processor 420 may determine that the first wireless audio device 402 is inserted into the external charging device. As another example, when the numerical value of the magnetic flux sensed via the magnetic sensor 443 is smaller than the specified first magnetic flux or equal to 0, the processor 420 may determine that the first wireless audio device 402 is separated from the external charging device. The specified first magnetic flux may be set based on factors such as the magnitude of the magnetic material of the external charging device, the magnetic permeability of the material constituting the magnetic material, and the distance between the magnetic material and the magnetic sensor 443.

The touch integrated circuit 410 may include a touch pad sensor 411, a first touch sensor 413, and a second touch sensor 415. The processor 420 may sense user inputs to a touch pad (e.g., the touch pad 13 in FIG. 3A) via the touch pad sensor 411. When the first touch sensor 413 is electrically connected to the first electrode 481, the processor 420 may sense a first capacitance of the first electrode 481 via the first touch sensor 413. When the second touch sensor 415 is electrically connected to the second electrode, the processor 420 may sense a second capacitance of the second electrode via the second touch sensor 415.

The processor 420 may electrically connect the first electrode 481 to the charging circuit 488 or the first touch sensor 413 via the first switch 450. The first switch 450 may include a first node 451, a second node 453, and a third node 455. The first node 451 may be electrically connected to the first electrode 481. The second node 453 may be electrically connected to the charging circuit 488. The third node 455 may be electrically connected to the first touch sensor 413. The first switch 450 may be a transistor having a plurality of nodes, such as a bipolar junction transistor or a metal-oxide-semiconductor field-effect transistor (MOSFET).

When the first wireless audio device 402 is inserted into the external charging device, the processor 420 may control the first switch 450 to electrically connect the first electrode 481 and the first charging circuit 488 to each other. The processor 420 may control the first switch 450 such that the first node 451 of the first switch 450 and the second node 453 of the first switch 450 are electrically connected to each other. The processor 420 may receive external power from the external charging device via the charging circuit 488 electrically connected to the first electrode 481, the first node 451, and the second node 453 to charge the first wireless audio device 402.

When the first wireless audio device 402 is separated from the external charging device, the processor 420 may control the first switch 450 to electrically connect the first electrode 481 and the first touch sensor 413 to each other. The processor 420 may control the first switch 450 such that the first node 451 of the first switch 450 and the third node 455 of the first switch 450 are electrically connected to each other. The processor 420 may sense the first capacitance of the first electrode 481 via the first touch sensor 413 electrically connected to the first electrode 481, the first node 451, and the third node 455.

The processor 420 may determine whether the user is wearing the first wireless audio device 402 based on the first capacitance and a first numerical value. For example, when the first capacitance is equal to or greater than the first numerical value, the processor 420 may determine that the user is wearing the first wireless audio device 402. As another example, when the first capacitance is smaller than the first numerical value, the processor 420 may determine that the user is not wearing the first wireless audio device 402.

The processor 420 may control the first numerical value based on the internal circuit structure of the first wireless audio device 402. When the structure of the circuits is changed, such as when a new component is added to the circuits, when a component included in the circuits is removed, when one element included in the circuits is replaced with another element, or when a position of the element included in the circuits is changed, the processor 420 may control to change the first numerical value. An initial value of the first numerical value may be preset when the first wireless audio device 402 is manufactured. The processor 420 may control the first numerical value based on the user repeatedly wearing the first wireless audio device 402.

According to one embodiment, the processor 420 may sense the magnetic flux of the magnetic material contained in the external electronic device via the magnetic sensor 443. When the sensed magnetic flux is equal to or greater than the specified first magnetic flux, the processor 420 may control the first switch 450 such that the first electrode 481 and the charging circuit 488 are electrically connected to each other. The processor 420 may charge the first wireless audio device 402 by receiving the power via the first electrode 481 connected to an electrode of the external charging device.

According to one embodiment, the processor 420 may sense the magnetic flux via the magnetic sensor 443. When the sensed magnetic flux is smaller than the specified first magnetic flux or 0, the processor 420 may control the first switch 450 such that the first electrode 481 and the first touch sensor 413 are electrically connected to each other. The processor 420 may sense the first capacitance of the first electrode 481 via the first touch sensor 413. When the first capacitance is equal to or greater than the first numerical value, the processor 420 may determine that the user is wearing the first wireless audio device 402. When the first capacitance is smaller than the first numerical value, the processor 420 may determine that the user is not wearing the first wireless audio device 402.

As disclosed in FIGS. 4A to 6B, when sensing the object using the first touch sensor 413 and/or the second touch sensor 415 or when sensing the object using the first touch sensor 413, the second touch sensor 415, and/or an infrared sensor 441 (e.g., the proximity sensor 50 in FIG. 3A), sensing accuracy may be increased compared to that of sensing the object using only the infrared sensor 441.

As disclosed in FIGS. 4A to 6B, when the first touch sensor 413 and/or the second touch sensor 415 are used to replace the infrared sensor 441, as the infrared sensor 441 is removed in the first wireless audio device 402, the internal mounting space in the first wireless audio device 402 may be increased and the manufacturing cost of the first wireless audio device 402 may be reduced because the infrared sensor 441 is no longer required.

As disclosed in FIGS. 4A to 6B, when the first switch 450 is replaced with a capacitor 457, the mounting space in the first wireless audio device 402 may be increased and the manufacturing cost of the first wireless audio device 402 may be reduced.

Figure 4B:
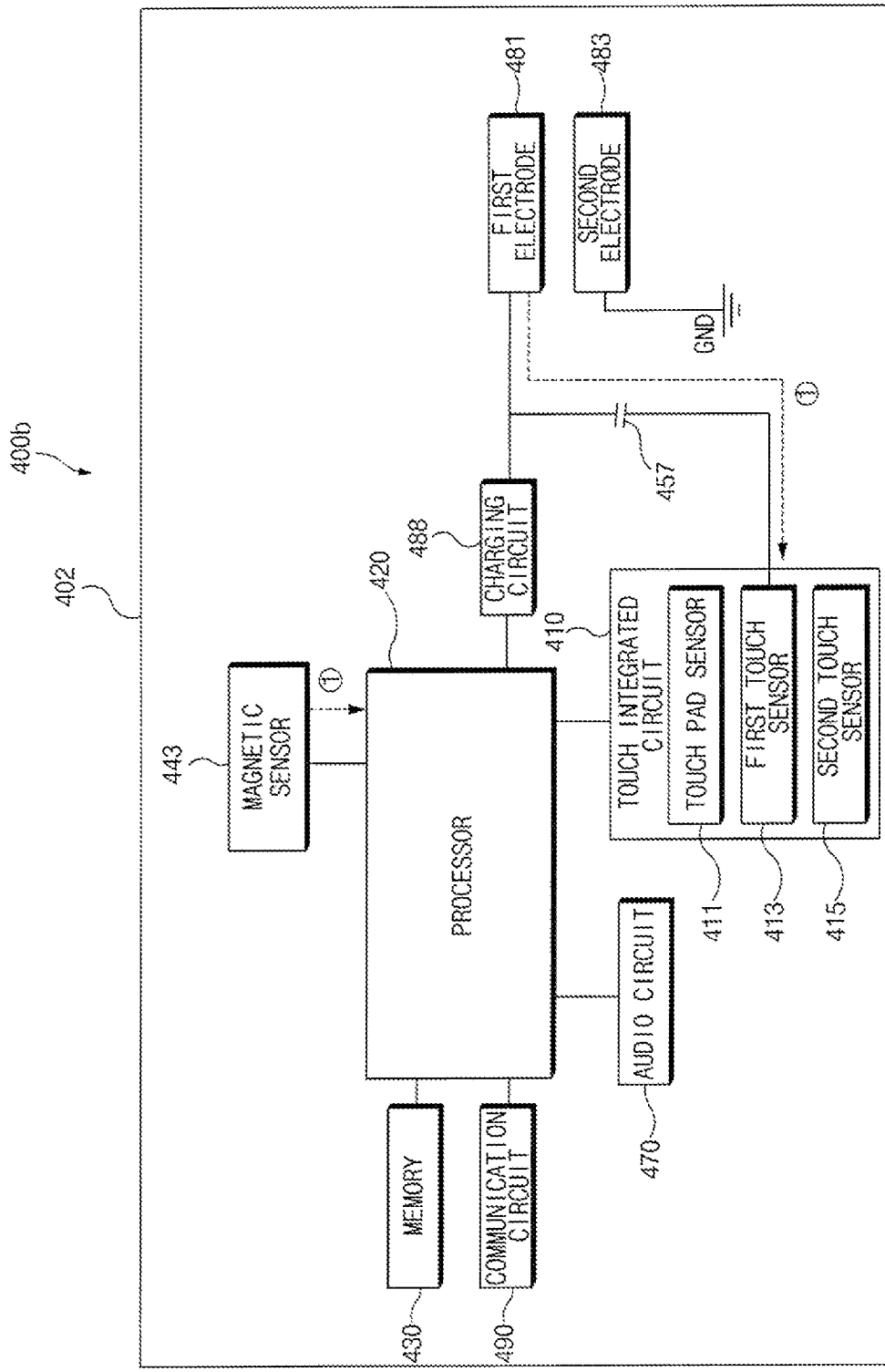
FIG. 4B is a block diagram of a first wireless audio device including a capacitor according to an embodiment of the disclosure.

FIG. 4B is a block diagram 400b of the first wireless audio device 402 including the capacitor 457 according to an embodiment of the disclosure. For convenience of description, duplicate descriptions may be omitted. Referring to FIG. 4B, the first switch 450 in FIG. 4A may be replaced with the capacitor 457. A first terminal of the capacitor 457 may be electrically connected to the first electrode 481 and the charging circuit 488. A second terminal of the capacitor 457 may be electrically connected to the first touch sensor 413.

The processor 420 may prevent a direct current (DC) component of the power received from the external charging device from being input to the first touch sensor 413 via the capacitor 457. When the first wireless audio device 402 is inserted into the external charging device and is being charged, the processor 420 may receive the power via a path from the first electrode 481 to the charging circuit 488 and the processor 420. The power received by the processor 420 may be DC power. For example, the power received by the processor 420 may be 5V DC power. The above-described 5V DC power is for illustration, and the value of the DC power supply may vary. The capacitor 457 may prevent the DC power from being applied to the path leading from the first electrode 481 to the capacitor 457 and the first touch sensor 413.

When the first wireless audio device 402 is separated from the external charging device, the processor 420 may not receive the power from the external charging device. The processor 420 may sense the first capacitance of the first electrode 481 via the path leading from the first touch sensor 413 to the capacitor 457 and the first electrode 481.

According to one embodiment, when the first wireless audio device 402 is inserted into the external electronic device, the processor 420 may charge the first wireless audio device 402 by receiving the power from the external charging device via the first electrode 481 connected to the electrode of the external charging device.

According to one embodiment, when the first wireless audio device 402 is separated from the external electronic device, the processor 420 may sense the first capacitance of the first electrode 481 via the first touch sensor 413. When the first capacitance is equal to or greater than a first numerical value (e.g., the first numerical value in FIG. 4A), the processor 420 may determine that the user is wearing the first wireless audio device 402. When the first capacitance is smaller than the first numerical value, the processor 420 may determine that the user is not wearing the first wireless audio device 402.

Figure 4C:
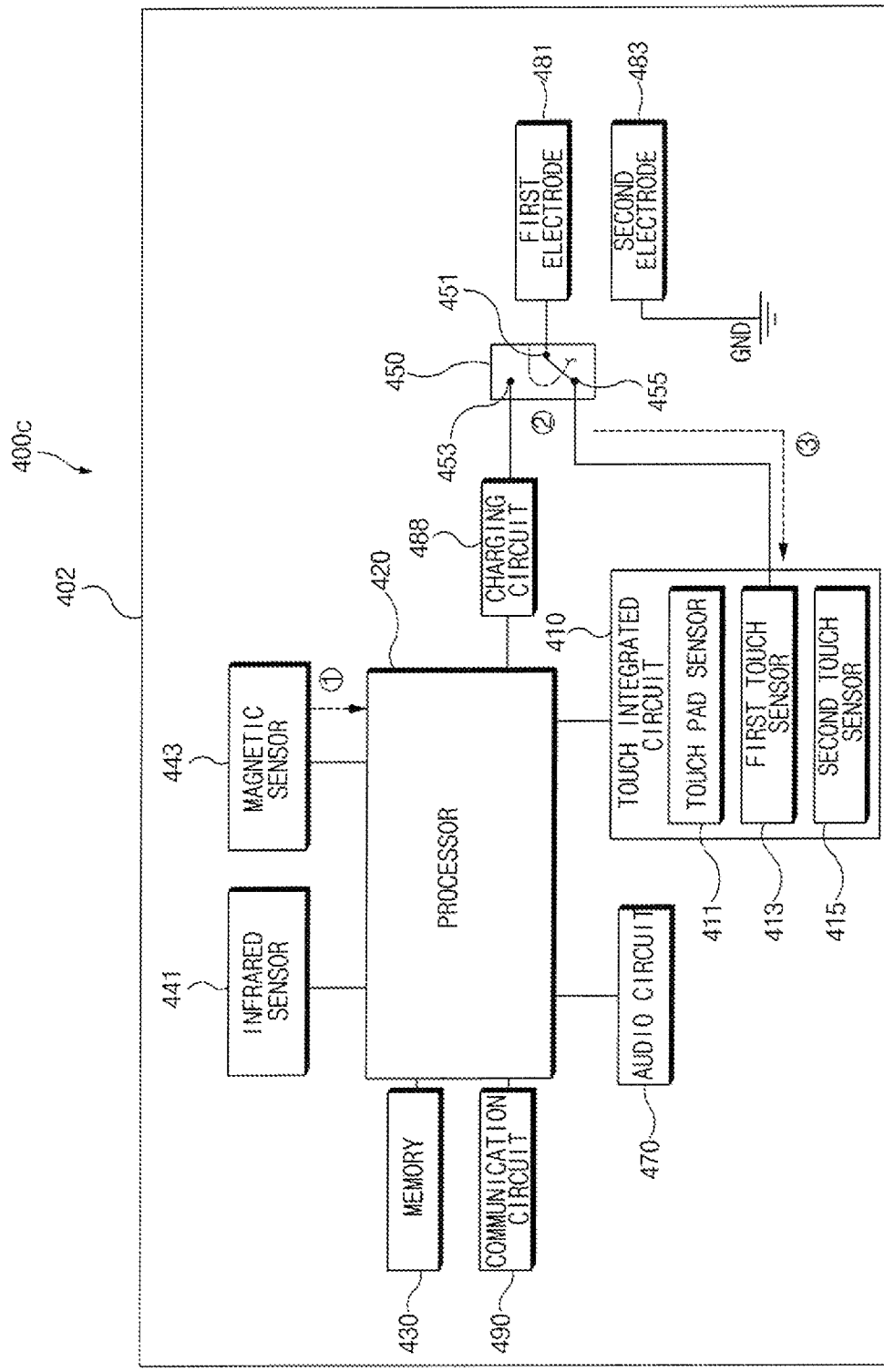
FIG. 4C is a block diagram of a first wireless audio device including an infrared sensor according to an embodiment of the disclosure.

FIG. 4C is a block diagram 400c of the first wireless audio device 402 including the infrared sensor 441 according to an embodiment of the disclosure. For convenience of description, duplicate descriptions may be omitted. The infrared sensor 441 may perform function(s) substantially the same as or similar to the IR (infrared) sensor in FIG. 1.

The infrared sensor 441 may include a light emitting circuit for outputting infrared light and a light receiving circuit for receiving the infrared light. The processor 420 may output the infrared light to the outside of the first wireless audio device 402 via an infrared light source included in the light emitting circuit. The processor 420 may receive the infrared light from the outside of the first wireless audio device 402 via an infrared light receiver included in the light receiving circuit.

The processor 420 may sense an object close to the first wireless audio device 402 using the infrared sensor 441. For example, the processor 420 may sense the object close to the first wireless audio device 402 based on the difference between a time point at which the infrared light is output from the infrared light source to a time point at which the infrared light reflected from a surface of the object is received by the infrared receiver. In other words, the processor 420 may sense the object close to the first wireless audio device 402 based on the infrared light received by the infrared receiver after the light is output from the infrared light source and then being reflected from the surface of the object.

The processor 420 may determine whether the user is wearing the first wireless audio device 402 based on whether the object close to the first wireless audio device 402 exists and the first capacitance. For example, when the object close to the first wireless audio device 402 exists and the first capacitance is equal to or greater than a first numerical value (e.g., the first numerical value in FIG. 4A), the processor 420 may determine that the user is wearing the first wireless audio device 402. As another example, when the object close to the first wireless audio device 402 does not exist or when the first capacitance is smaller than the first numerical value, the processor 420 may determine that the user is not wearing the first wireless audio device 402.

According to one embodiment, the processor 420 may sense the magnetic flux of the magnetic material contained in the external electronic device via the magnetic sensor 443. When the sensed magnetic flux is equal to or greater than a specified first magnetic flux (e.g., the specified first magnetic flux in FIG. 4A), the processor 420 may control the first switch 450 such that the first electrode 481 and the charging circuit 488 are electrically connected to each other. The processor 420 may receive the power via the electrode of the external charging device connected to the first electrode 481 to charge the first wireless audio device 402.

According to one embodiment, the processor 420 may sense the magnetic flux via the magnetic sensor 443. When the sensed magnetic flux is smaller than the specified first magnetic flux or 0, the processor 420 may control the first switch 450 such that the first electrode 481 and the first touch sensor 413 are electrically connected to each other. The processor 420 may sense the first capacitance of the first electrode 481 via the first touch sensor 413. The processor 420 may sense the object around the first wireless audio device 402 via the infrared sensor 441. The processor 420 may sense the object around the first wireless audio device 402, and, when the first capacitance is equal to or greater than the first numerical value, may determine that the user is wearing the first wireless audio device 402. When the processor 420 fails to sense the object around the first wireless audio device 402 or when the first capacitance is smaller than the first numerical value, the processor 420 may determine that the user is not wearing the first wireless audio device 402.

Figure 5A:
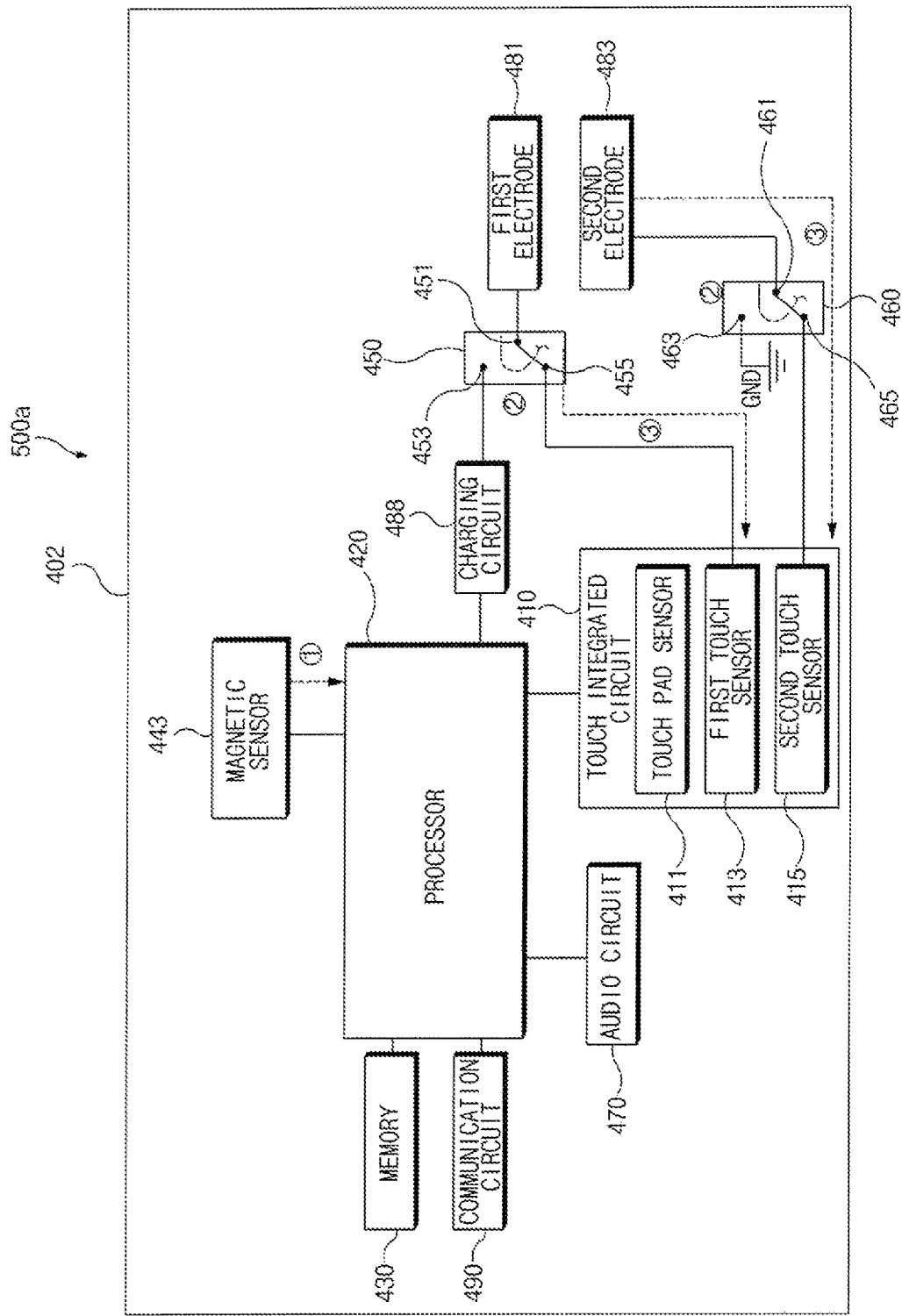
FIG. 5A is a block diagram of a first wireless audio device including a first switch and a second switch according to an embodiment of the disclosure.

FIG. 5A is a block diagram 500*a* of the first wireless audio device 402 including the first switch 450 and a second switch 460 according to an embodiment of the disclosure. For convenience of description, duplicate descriptions may be omitted. The first switch 450 may perform substantially the same function as the first switch 450 in FIG. 4A.

The processor 420 may electrically connect the second electrode 483 to the second touch sensor 415 or the ground via the second switch 460. The second switch 460 may include a fourth node 461, a fifth node 463, and a sixth node 465. The fourth node 461 may be electrically connected to the second electrode 483. The fifth node 463 may be electrically connected to the ground. The sixth node 465 may be electrically connected to the second touch sensor 415.

When the first wireless audio device 402 is inserted into the external charging device, the processor 420 may control the first switch 450 to electrically connect the first electrode 481 and the charging circuit 488 to each other. The processor 420 may control the first switch 450 such that the first node 451 of the first switch 450 and the second node 453 of the first switch 450 are electrically connected to each other.

When the first wireless audio device 402 is inserted into the external charging device, the processor 420 may control the second switch 460 to electrically connect the second electrode 483 and the ground to each other. The processor 420 may control the second switch 460 such that the fourth node 461 of the second switch 460 and the fifth node 463 of the second switch 460 are electrically connected to each other.

When the first wireless audio device 402 is separated from the external charging device, the processor 420 may control the first switch 450 to electrically connect the first electrode 481 and the first touch sensor 413 to each other. The processor 420 may control the first switch 450 such that the first node 451 of the first switch 450 and the third node 455 of the first switch 450 are electrically connected to each other.

When the first wireless audio device 402 is separated from the external charging device, the processor 420 may control the second switch 460 to electrically connect the second electrode 483 and the second touch sensor 415 to each other. The processor 420 may control the second switch 460 such that the fourth node 461 of the second switch 460 and the sixth node 465 of the second switch 460 are electrically connected to each other. The processor 420 may sense the second capacitance of the second electrode 483 via the second touch sensor 415 electrically connected to the second electrode 483, the fourth node 461, and the sixth node 465.

The processor 420 may determine whether the user is wearing the first wireless audio device 402 based on the first capacitance and the second capacitance. For example, when the first capacitance is equal to or greater than a first numerical value (e.g., the first numerical value in FIG. 4A) and the second capacitance is equal to or greater than a second numerical value, the processor 420 may determine that the user is wearing the first wireless audio device 402. As another example, when the first capacitance is smaller than the first numerical value or the second capacitance is smaller than the second numerical value, the processor 420 may determine that the user is not wearing the first wireless audio device 402.

According to the present embodiment, the processor 420 may determine that the user is wearing the first wireless audio device 402 only when the first capacitance is equal to or greater than the first numerical value and the second capacitance is equal to or greater than the second numerical value, so that the processor 420 may increase accuracy of sensing whether the first wireless audio device 402 is worn.

The processor 420 may control the second numerical value based on a method substantially the same as or similar to the method for controlling the first numerical value. The second numerical value controlled by the processor 420 may or may not be the same as the first numerical value.

According to one embodiment, the processor 420 may sense the magnetic flux of the magnetic material contained in the external electronic device via the magnetic sensor 443. When the sensed magnetic flux is equal to or greater than a specified first magnetic flux (e.g., the specified first magnetic flux in FIG. 4A), the processor 420 may control the first switch 450 such that the first electrode 481 and the charging circuit 488 are electrically connected to each other, and may control the second switch 460 such that the second electrode 483 and the ground are connected to each other. The processor 420 may receive the power via the electrode of the external charging device connected to the first electrode 481 to charge the first wireless audio device 402.

According to one embodiment, the processor 420 may sense the magnetic flux via the magnetic sensor 443. When the sensed magnetic flux is smaller than the specified first magnetic flux or is 0, the processor 420 may control the first switch 450 such that the first electrode 481 and the first touch sensor 413 are electrically connected to each other, and may control the second switch 460 such that the second electrode 483 and the second touch sensor 415 are electrically connected to each other. The processor 420 may sense the first capacitance of the first electrode 481 via the first touch sensor 413, and may sense the second capacitance of the second electrode 483 via the second touch sensor 415. When the first capacitance is equal to or greater than the first numerical value and the second capacitance is equal to or greater than the second numerical value, the processor 420 may determine that the user is wearing the first wireless audio device 402. When the first capacitance is smaller than the first numerical value or the second capacitance is smaller than the second numerical value, the processor 420 may determine that the user is not wearing the first wireless audio device 402.

Figure 5B:
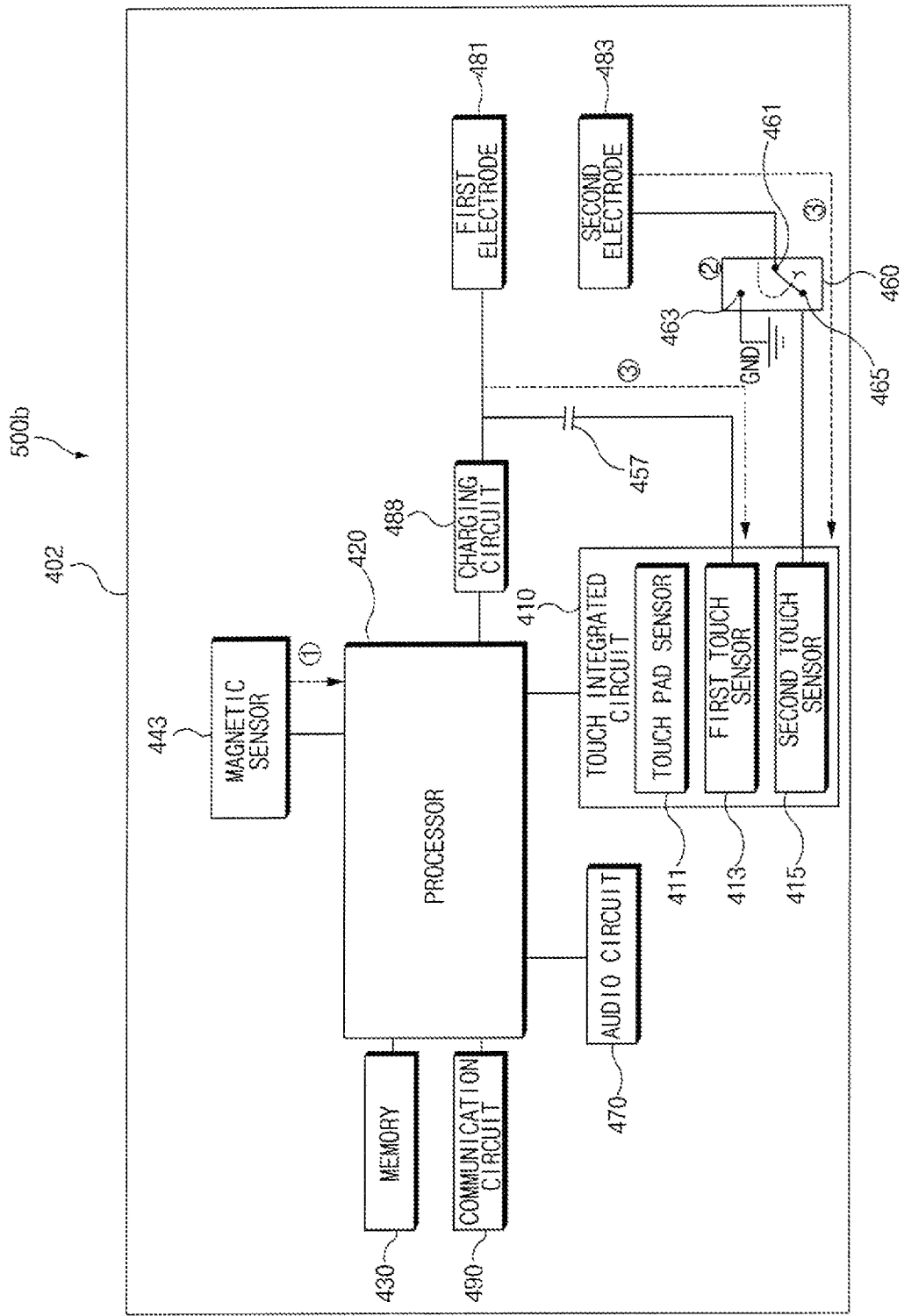
FIG. 5B is a block diagram of a first wireless audio device including a capacitor and a second switch according to an embodiment of the disclosure.

FIG. 5B is a block diagram 500*b* of the first wireless audio device 402 including the capacitor 457 and the second switch 460 according to an embodiment of the disclosure. For convenience of description, duplicate descriptions may be omitted. Referring to FIG. 5B, the first switch 450 in FIG. 5A may be replaced with the capacitor 457. The processor 420 may prevent the direct current (DC) component of the power received from the external charging device from being input to the first touch sensor 413 via the capacitor 457. The capacitor 457 in FIG. 5B may be substantially the same as or similar to the capacitor 457 in FIG. 4B.

According to one embodiment, the processor 420 may sense the magnetic flux of the magnetic material contained in the external electronic device via the magnetic sensor 443. When the sensed magnetic flux is equal to or greater than a specified first magnetic flux (e.g., the specified first magnetic flux in FIG. 4A), the processor 420 may control the second switch 460 such that the second electrode 483 and the ground are connected to each other. The processor 420 may receive the power via the electrode of the external charging device connected to the first electrode 481 to charge the first wireless audio device 402.

According to one embodiment, the processor 420 may sense the magnetic flux via the magnetic sensor 443. When the sensed magnetic flux is smaller than the specified first magnetic flux or 0, the processor 420 may control the second switch 460 such that the second electrode 483 and the second touch sensor 415 are electrically connected to each other. The processor 420 may sense the first capacitance of the first electrode 481 via the first touch sensor 413. The processor 420 may sense the second capacitance of the second electrode 483 via the second touch sensor 415. When the first capacitance is equal to or greater than a first numerical value (e.g., the first numerical value in FIG. 4A) and the second capacitance is equal to or greater than a second numerical value (e.g., the second numerical value of FIG. 5A), the processor 420 may determine that the user is wearing the first wireless audio device 402. When the first capacitance is smaller than the first numerical value or the second capacitance is smaller than the second numerical value, the processor 420 may determine that the user is not wearing the first wireless audio device 402.

Figure 6A:
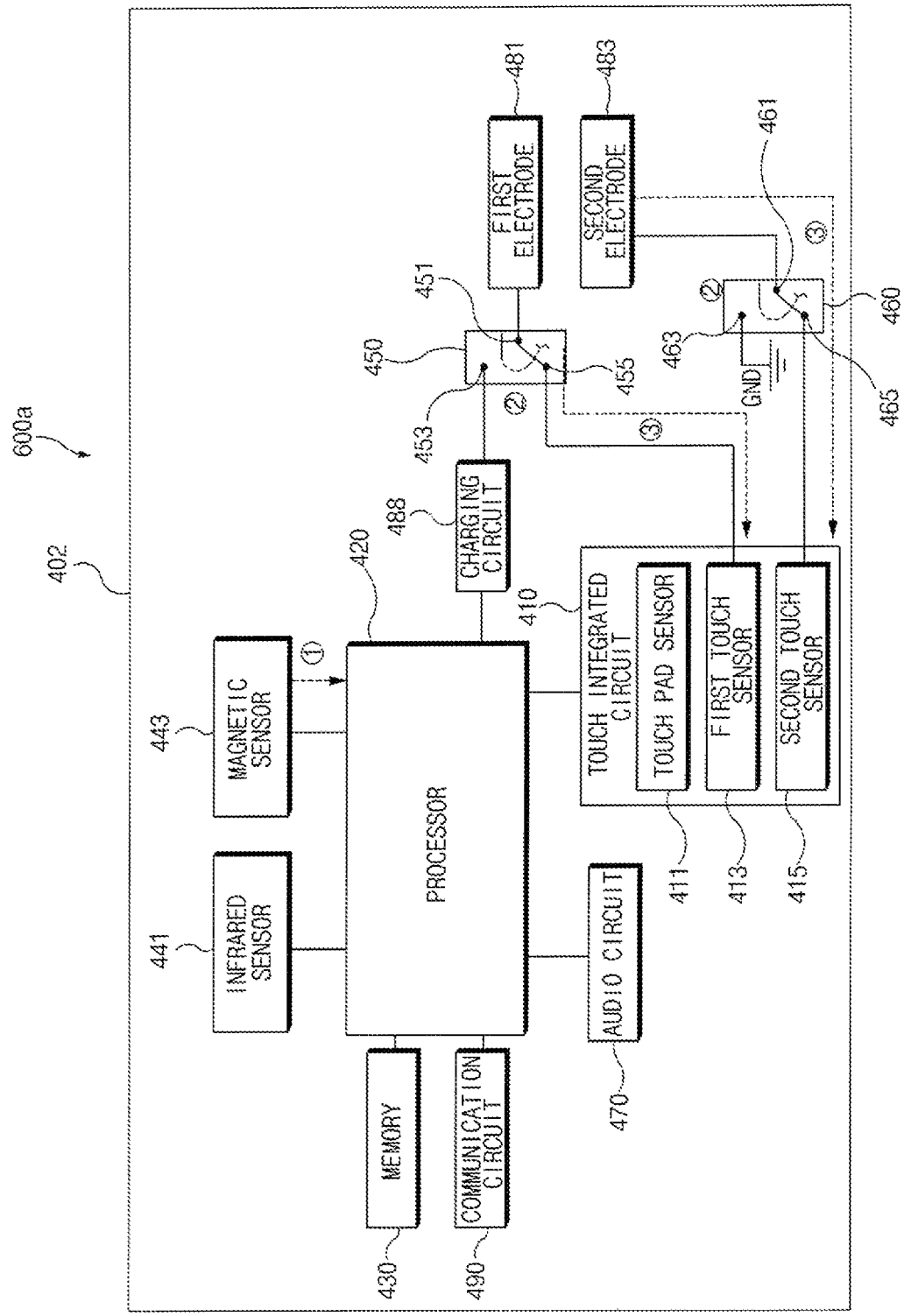
FIG. 6A is a block diagram of a first wireless audio device including an infrared sensor, a first switch, and a second switch according to an embodiment of the disclosure.

FIG. 6A is a block diagram 600a of the first wireless audio device 402 including the infrared sensor 441, the first switch 450, and the second switch 460 according to an embodiment of the disclosure. For convenience of description, duplicate descriptions may be omitted.

The first switch 450 and the second switch 460 in FIG. 6A may be substantially the same as or similar to the first switch 450 and the second switch 460 in FIG. 5A, respectively. The infrared sensor 441 may be substantially the same as or similar to the infrared sensor 441 in FIG. 4C.

The processor 420 may determine whether the user is wearing the first wireless audio device 402 based on whether the object close to the first wireless audio device 402 exists, as sensed by the infrared sensor 441, the first capacitance, and the second capacitance. For example, when the object close to the first wireless audio device 402 exists, the first capacitance is equal to or greater than a first numerical value (e.g., the first numerical value in FIG. 4A), and the second capacitance is equal to or greater than a second numerical value (e.g., the second numerical value in FIG. 5A), the processor 420 may determine that the user is wearing the first wireless audio device 402. As another example, when the object close to the first wireless audio device 402 does not exist, the first capacitance is smaller than the first numerical value, or the second capacitance is smaller than the second numerical value, the processor 420 may determine that the user is not wearing the first wireless audio device 402.

According to the present embodiment, the processor 420 determines that the user is wearing the first wireless audio device 402 only when the processor 420 senses the object via the infrared sensor 441, the first capacitance is equal to or greater than the first numerical value, and the second capacitance is equal to or greater than the second numerical value, so that the accuracy of sensing, by the processor 420, whether the first wireless audio device 402 is worn may be increased.

According to one embodiment, the processor 420 may sense the magnetic flux of the magnetic material contained in the external electronic device via the magnetic sensor 443. When the sensed magnetic flux is equal to or greater than a specified first magnetic flux (e.g., the specified first magnetic flux in FIG. 4A), the processor 420 may control the first switch 450 such that the first electrode 481 and the charging circuit 488 are electrically connected to each other and control the second switch 460 such that the second electrode 483 and the ground are connected to each other. The processor 420 may receive the power via the electrode of the external charging device connected to the first electrode 481 to charge the first wireless audio device 402.

According to one embodiment, the processor 420 may sense the magnetic flux via the magnetic sensor 443. When the sensed magnetic flux is smaller than the specified first magnetic flux or is 0, the processor 420 may control the first switch 450 such that the first electrode 481 and the first touch sensor 413 are electrically connected to each other and control the second switch 460 such that the second electrode 483 and the second touch sensor 415 are electrically connected to each other. The processor 420 may sense the first capacitance of the first electrode 481 via the first touch sensor 413 and may sense the second capacitance of the second electrode 483 via the second touch sensor 415. The processor 420 may sense the object around the first wireless audio device 402 via the infrared sensor 441.

The processor 420 may determine that the user is wearing the first wireless audio device 402 when the object around the first wireless audio device 402 is sensed, the first capacitance is equal to or greater than the first numerical value and the second capacitance is equal to or greater than the second numerical value. The processor 420 may determine that the user is not wearing the first wireless audio device 402 when the object around the first wireless audio device 402 is not sensed, the first capacitance is smaller than the first numerical value, or the second capacitance is smaller than the second numerical value.

Figure 6B:
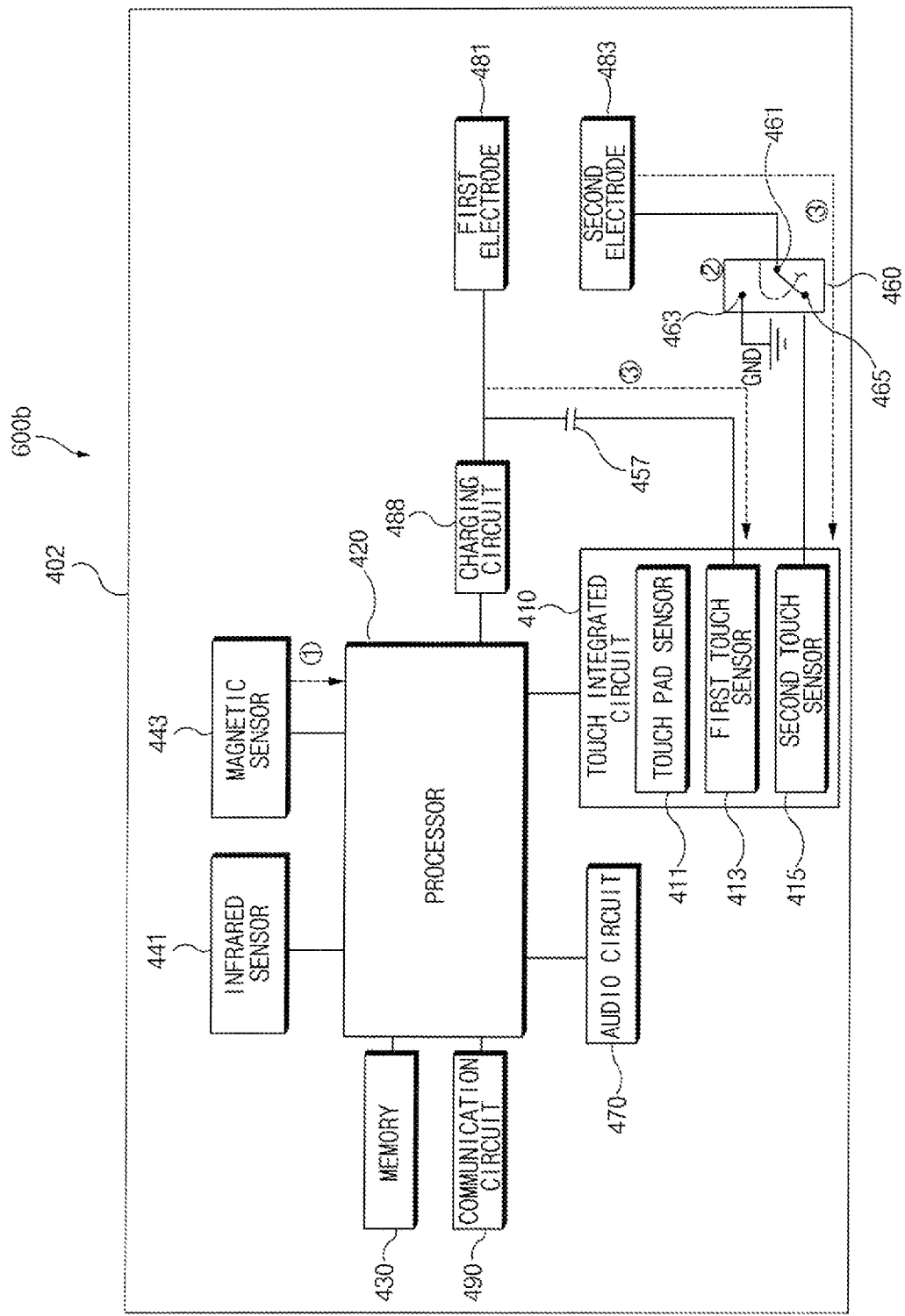
FIG. 6B is a block diagram of a first wireless audio device including an infrared sensor, a capacitor, and a second switch according to an embodiment of the disclosure.

FIG. 6B is a block diagram 600b of the first wireless audio device 402 including the infrared sensor 441, the capacitor 457, and the second switch 460 according to an embodiment of the disclosure. For convenience of description, duplicate descriptions may be omitted.

The capacitor 457 may be substantially the same as or similar to the capacitor 457 in FIG. 5B. The second switch 460 may be substantially the same as or similar to the second switch 460 in FIG. 6A. The infrared sensor 441 may be substantially the same as or similar to the infrared sensor 441 in FIG. 6A.

According to one embodiment, the processor 420 may sense the magnetic flux of the magnetic material contained in the external electronic device via the magnetic sensor 443. When the sensed magnetic flux is equal to or greater than a specified first magnetic flux (e.g., the specified first magnetic flux in FIG. 4A), the processor 420 may control the second switch 460 such that the second electrode 483 and the ground are connected to each other. The processor 420 may receive the power via the electrode of the external charging device connected to the first electrode 481 to charge the first wireless audio device 402.

According to one embodiment, the processor 420 may sense the magnetic flux via the magnetic sensor 443. When the sensed magnetic flux is smaller than the specified first magnetic flux, the processor 420 may control the second switch 460 such that the second electrode 483 and the second touch sensor 415 are electrically connected to each other. The processor 420 may sense the first capacitance of the first electrode 481 via the first touch sensor 413. The processor 420 may sense the second capacitance of the second electrode 483 via the second touch sensor 415. The processor 420 may sense the object around the first wireless audio device 402 via the infrared sensor 441.

The processor 420 may determine that the user is wearing the first wireless audio device 402 when the object around the first wireless audio device 402 is sensed, the first capacitance is equal to or greater than a first numerical value (e.g., the first numerical value in FIG. 4A) and the second capacitance is equal to or greater than a second numerical value (e.g., the second numerical value in FIG. 5A). The processor 420 may determine that the user is not wearing the first wireless audio device 402 when the object around the first wireless audio device 402 is not sensed, the first capacitance is smaller than the first numerical value, or the second capacitance is smaller than the second numerical value.

Figure 7A:
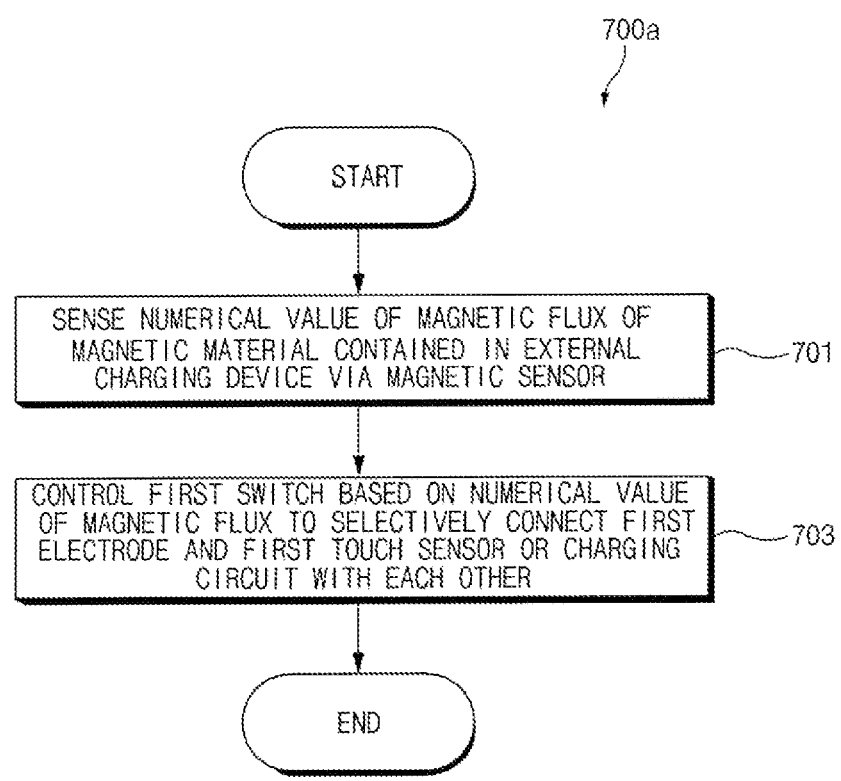
FIG. 7A is a flowchart for an operation of a first wireless audio device including a first switch according to an embodiment of the disclosure.

FIG. 7A is a flowchart 700*a* for an operation of a first wireless audio device (e.g., the first wireless audio device 402 in FIG. 4A) including a first switch according to an embodiment of the disclosure. Referring to FIG. 7A, in operation 701, the processor 420 (e.g., the processor 420 in FIG. 4A) may sense the numerical value of the magnetic flux of the magnetic material contained in the external charging device via a magnetic sensor (e.g., the magnetic sensor 443 in FIG. 4A).

In operation 703, the processor 420 may control a first switch (e.g., the first switch 450 in FIG. 4A) based on the numerical value of the magnetic flux to selectively connect a first electrode (e.g., the first electrode 481 in FIG. 4A) and a first touch sensor (e.g., the first touch sensor 413 in FIG. 4A) or the charging circuit 488 with each other.

Figure 7B:
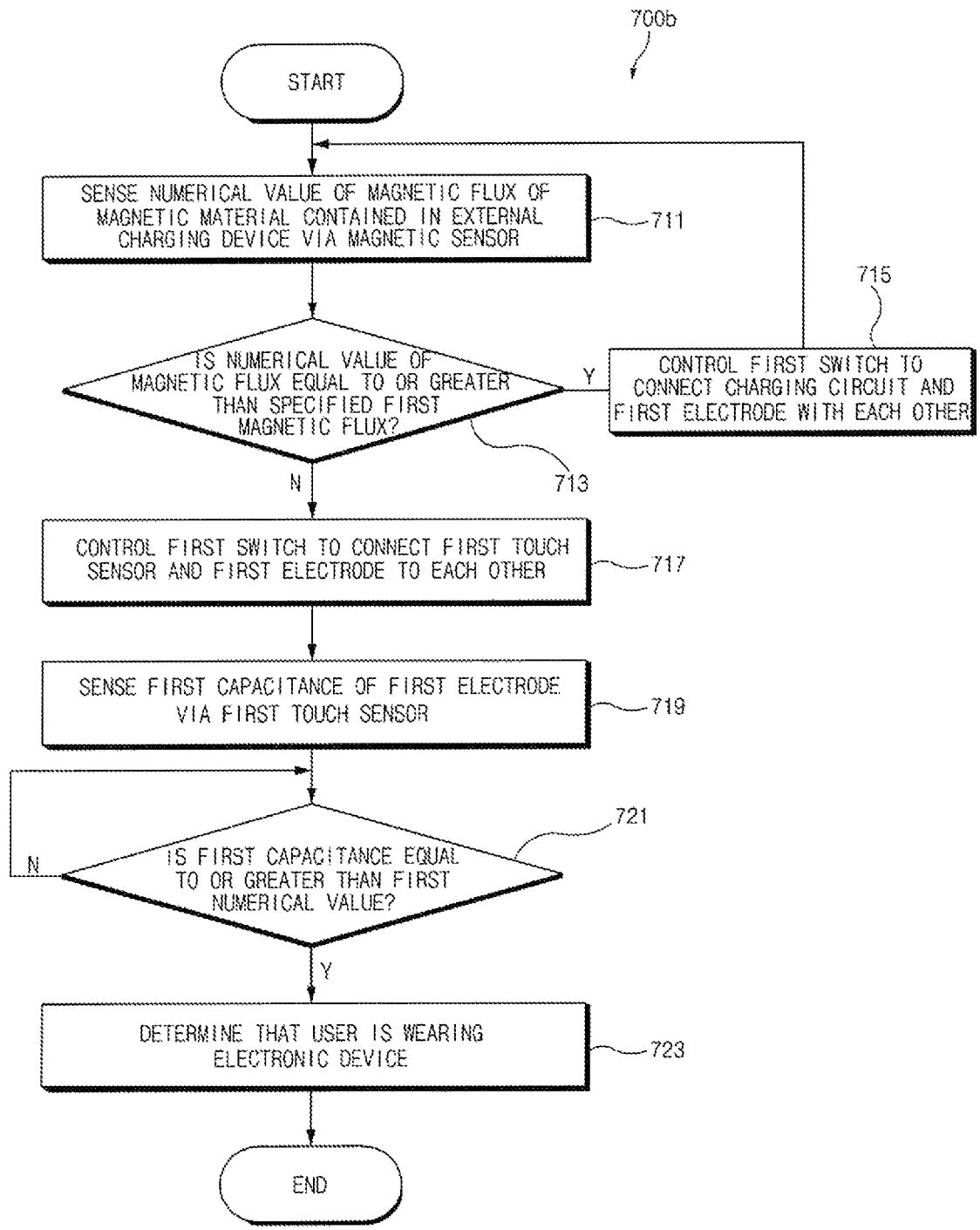
FIG. 7B is a flowchart illustrating a more specific implementation of the operations shown in FIG. 7A according to an embodiment of the disclosure.

FIG. 7B is a flowchart 700*b* illustrating a more specific implementation of the operations shown in FIG. 7A according to an embodiment of the disclosure. Referring to FIG. 7B, in operation 711, the processor 420 (e.g., the processor 420 in FIG. 4A) may sense the numerical value of the magnetic flux of the magnetic material contained in the external charging device via a magnetic sensor (e.g., the magnetic sensor 443 in FIG. 4A). In operation 713, the processor 420 may determine whether the numerical value of the magnetic flux is equal to or greater than a specified first magnetic flux (e.g., the specified first magnetic flux in FIG. 4A).

When the numerical value of the magnetic flux sensed by the processor 420 is equal to or greater than the specified first magnetic flux (operation 713-Y), the processor 420 may perform operation 715. In operation 715, the processor 420 may control a first switch (e.g., the first switch 450 in FIG. 4A) to connect a charging circuit (e.g., the charging circuit 488 in FIG. 4A) and a first electrode (e.g., the first electrode 481 in FIG. 4A) with each other. The processor 420 may receive the power from the external charging device via the first electrode 481 connected to the electrode of the external charging device to charge the first wireless audio device 402.

When the numerical value of the magnetic flux sensed by the processor 420 is smaller than the specified first magnetic flux (operations 713-N), the processor 420 may perform operation 717. In operation 717, the processor 420 may control the first switch 450 to connect a first touch sensor (e.g., the first touch sensor 413 in FIG. 4A) and the first electrode 481 to each other.

In operation 719, the processor 420 may sense the first capacitance of the first electrode 481 via the first touch sensor 413. In operation 721, the processor 420 may determine whether the first capacitance is equal to or greater than a first numerical value (e.g., the first numerical value in FIG. 4A).

When the processor 420 determines that the first capacitance is equal to or greater than the first numerical value, the processor 420 may perform operation 723. In operation 723, the processor 420 may determine that the user is wearing an electronic device (e.g., the wireless audio device 204 in FIG. 2). When the processor 420 determines that the first capacitance is smaller than the first numerical value, the processor 420 may perform operation 721 again.

The processor 420 may perform operation 721 based on a set period. For example, the processor 420 may perform operation 721 based on a preset clock period. For example, the processor 420 may perform operation 721 in every clock period. As another example, the processor 420 may perform operation 721 at various given clock periods, such as every second clock period, every third clock period, or every fourth clock period.

Figure 8A:
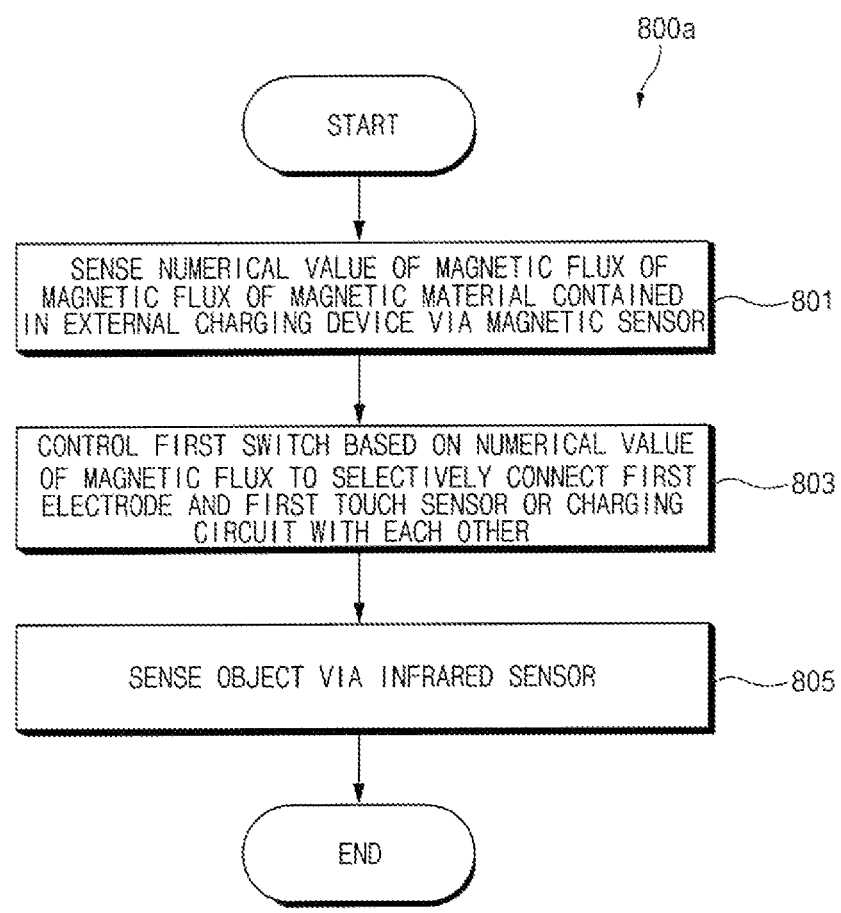
FIG. 8A is a flowchart for an operation of a first wireless audio device including a first switch and an infrared sensor according to an embodiment of the disclosure.

FIG. 8A is a flowchart 800*a* for an operation of a first wireless audio device (e.g., the first wireless audio device 402 in FIG. 4C) including a first switch (e.g., the first switch 450 in FIG. 4C) and an infrared sensor (e.g., the infrared sensor 441 in FIG. 4C) according to an embodiment of the disclosure.

Referring to FIG. 8A, in operation 801, the processor 420 (e.g., the processor 420 in FIG. 4C) may sense the numerical value of the magnetic flux of the magnetic material contained in the external charging device via a magnetic sensor (e.g., the magnetic sensor 443 in FIG. 4C).

In operation 803, based on the numerical value of the magnetic flux, the processor 420 may control the first switch 450 to selectively connect a first electrode (e.g., the first electrode 481 in FIG. 4C) and a first touch sensor (e.g., the first touch sensor 413 in FIG. 4C) or a charging circuit (e.g., the charging circuit 488 in FIG. 4C) to each other.

In operation 805, the processor 420 may sense the object via the infrared sensor 441.

Figure 8B:
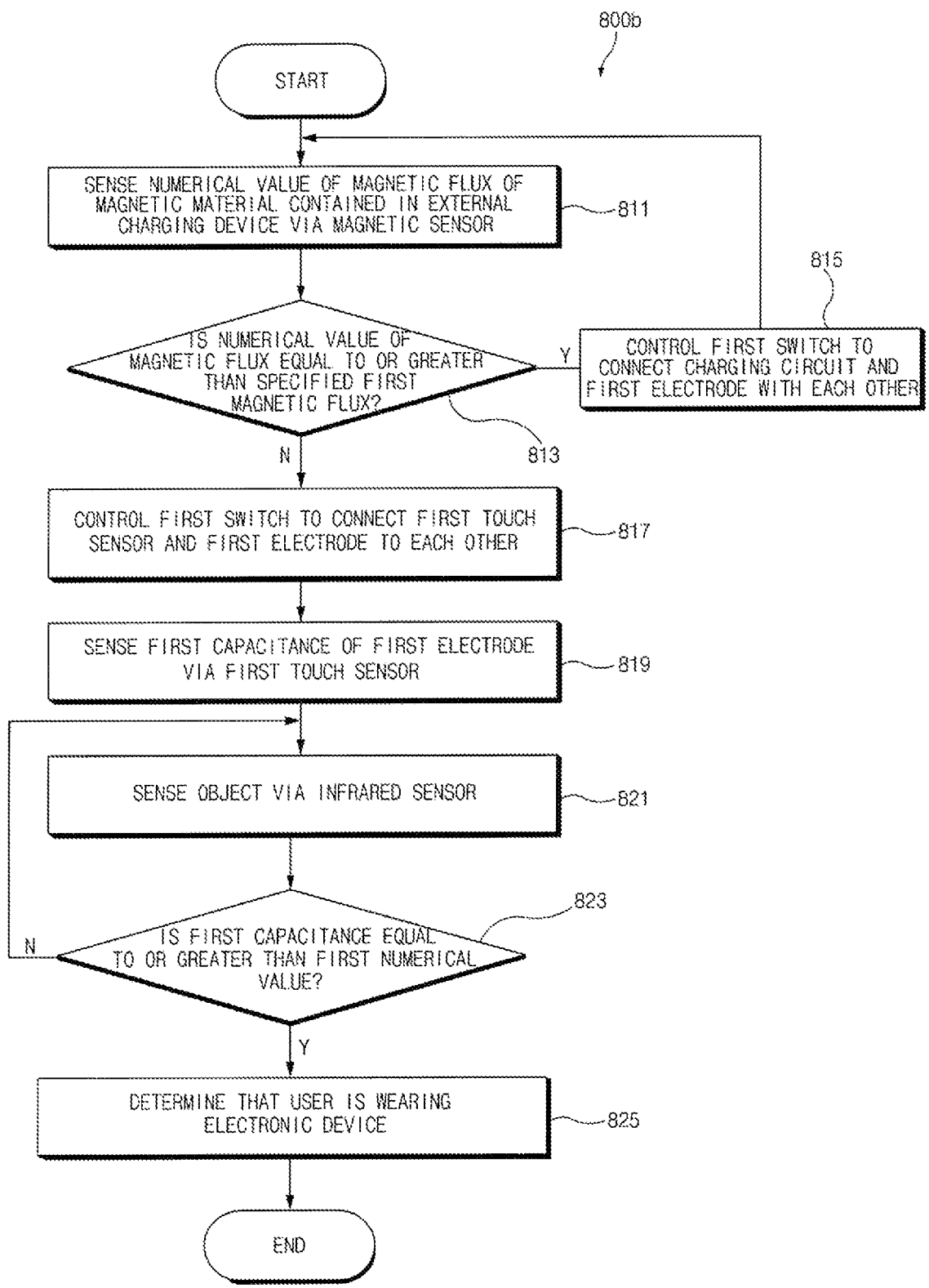
FIG. 8B is a flowchart illustrating a more specific implementation of the operations shown in FIG. 8A according to an embodiment of the disclosure.

FIG. 8B is a flowchart 800*b* illustrating a more specific implementation of the operations shown in FIG. 8A according to an embodiment of the disclosure. Referring to FIG. 8B, in operation 811, the processor 420 (e.g., the processor 420 in FIG. 4C) may sense the numerical value of the magnetic flux of the magnetic material contained in the external charging device via a magnetic sensor (e.g., the magnetic sensor 443 in FIG. 4C). In operation 813, the processor 420 may determine whether the numerical value of the magnetic flux is equal to or greater than a specified first magnetic flux (e.g., the specified first magnetic flux in FIG. 4C).

When the numerical value of the magnetic flux sensed by the processor 420 is equal to or greater than the specified first magnetic flux (operation 813-Y), the processor 420 may perform operation 815. In operation 815, the processor 420 may control a first switch (e.g., the first switch 450 in FIG. 4C) to connect a charging circuit (e.g., the charging circuit 488 in FIG. 4C) and a first electrode (e.g., the first electrode 481 in FIG. 4C) to each other. The processor 420 may receive the power from the external charging device via the first electrode 481 connected to the electrode of the external charging device to charge the first wireless audio device 402.

When the numerical value of the magnetic flux sensed by the processor 420 is smaller than the specified first magnetic flux (operations 813-N), the processor 420 may perform operation 817.

In operation 817, the processor 420 may control the first switch 450 to connect a first touch sensor (e.g., the first touch sensor 413 in FIG. 4C) and the first electrode 481 to each other. In operation 819, the processor 420 may sense the first capacitance of the first electrode 481 via the first touch sensor 413. In operation 821, the processor 420 may sense the object via an infrared sensor (e.g., the infrared sensor 441 in FIG. 4C).

In operation 823, the processor 420 may determine whether the first capacitance is equal to or greater than a first numerical value (e.g., the first numerical value in FIG. 4A). When the processor 420 determines that the first capacitance is equal to or greater than the first numerical value, the processor 420 may perform operation 825. In operation 825, the processor 420 may determine that the user is wearing an electronic device (e.g., the wireless audio device 204 in FIG. 2). When the processor 420 determines that the first capacitance is smaller than the first numerical value, the processor 420 may perform operation 821 again.

The processor 420 may perform operations 821-823 based on a set period. For example, the processor 420 may perform operations 821-823 based on a preset clock period. For example, the processor 420 may perform operations 821-823 in every clock period. As another example, the processor 420 may perform operations 821-823 at various given clock periods, such as every second clock period, every third clock period, or every fourth clock period.

Figure 9A:
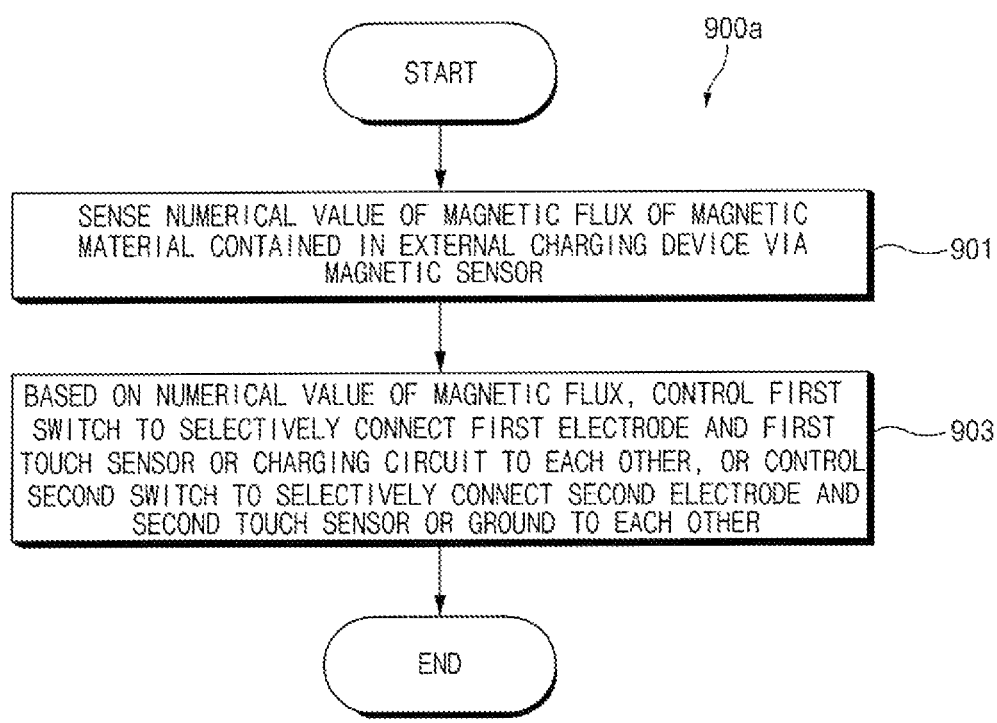
FIG. 9A is a flowchart for a first wireless audio device including a first switch and a second switch according to an embodiment of the disclosure.

FIG. 9A is a flowchart 900a for a first wireless audio device (e.g., the first wireless audio device 402 in FIG. 5A) including a first switch (e.g., the first switch 450 in FIG. 5A) and a second switch (e.g., the second switch 460 in FIG. 5A) according to an embodiment of the disclosure.

Referring to FIG. 9A, in operation 901, the processor 420 (e.g., the processor 420 in FIG. 5A) may sense the numerical value of the magnetic flux of the magnetic material contained in the external charging device via a magnetic sensor (e.g., the magnetic sensor 443 in FIG. 5A). In operation 903, based on the numerical value of the magnetic flux, the processor 420 may control the first switch 450 to selectively connect a first electrode (e.g., the first electrode 481 in FIG. 5A) and a first touch sensor (e.g., the first touch sensor 413 in FIG. 5A) or a charging circuit (e.g., 488) to each other, or may control the second switch 460 to selectively connect a second electrode (e.g., the second electrode 483 in FIG. 5A) and the second touch sensor 415 (e.g., the second touch sensor 415 in FIG. 5A) or the ground to each other.

Figure 9B:
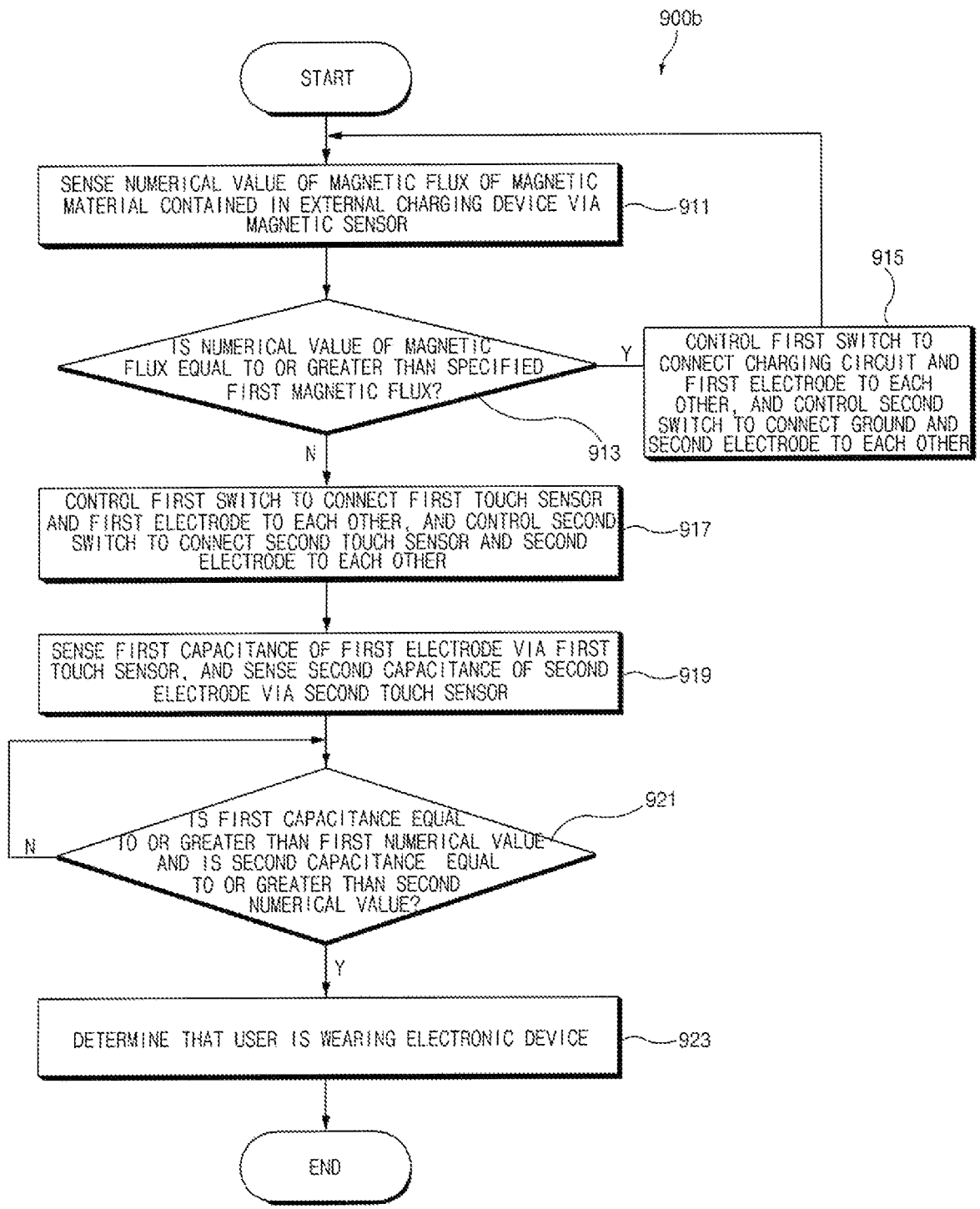
FIG. 9B is a flowchart illustrating a more specific implementation of the operations shown in FIG. 9A of the disclosure.

FIG. 9B is a flowchart 900b illustrating a more specific implementation of the operations shown in FIG. 9A of the disclosure. Referring to FIG. 9B, in operation 911, the processor 420 (e.g., the processor 420 in FIG. 5A) may sense the numerical value of the magnetic flux of the magnetic material contained in the external charging device via a magnetic sensor (e.g., the magnetic sensor 443 in FIG. 5A). In operation 913, the processor 420 may determine whether the numerical value of the magnetic flux is equal to or greater than a specified first magnetic flux (e.g., the specified first magnetic flux in FIG. 5A).

When the numerical value of the magnetic flux sensed by the processor 420 is equal to or greater than the specified first magnetic flux (operation 913-Y), the processor 420 may perform operation 915. In operation 915, the processor 420 may control a first switch (e.g., the first switch 450 in FIG. 5A) to connect a charging circuit (e.g., the charging circuit 488 in FIG. 5A) and a first electrode (e.g., the first electrode 481 in FIG. 5A) to each other, and may control a second switch (e.g., the second switch 460 in FIG. 5A) to connect the ground and a second electrode (e.g., the second electrode 483 in FIG. 5A) to each other. The processor 420 may receive the power from the external charging device via the first electrode 481 connected to the electrode of the external charging device to charge the first wireless audio device 402.

When the numerical value of the magnetic flux sensed by the processor 420 is smaller than the specified first magnetic flux (operation 913-N), the processor 420 may perform operation 917. In operation 917, the processor 420 may control the first switch 450 to connect a first touch sensor (e.g., the first touch sensor 413 in FIG. 5A) and the first electrode 481 to each other, and control the second switch 460 to connect the second touch sensor 415 (e.g., the second touch sensor 415 in FIG. 5A) and the second electrode 483 to each other.

In operation 919, the processor 420 may sense the first capacitance of the first electrode 481 via the first touch sensor 413, and sense the second capacitance of the second electrode 483 via the second touch sensor 415. In operation 921, the processor 420 may determine whether the first capacitance is equal to or greater than a first numerical value (e.g., the first numerical value in FIG. 5A) and whether the second capacitance is equal to or greater than a second numerical value (e.g., the second numerical value in FIG.

When the processor 420 determines that the first capacitance is equal to or greater than the first numerical value and the second capacitance is equal to or greater than the second numerical value (operation 921-Y), the processor 420 may perform operation 923. In operation 923, the processor 420 may determine that the user is wearing an electronic device (e.g., the wireless audio device 204 in FIG. 2).

When the processor 420 determines that the first capacitance is smaller than the first numerical value or the second capacitance is smaller than the second numerical value (operations 921-N), the processor 420 may perform operation 921 again.

The processor 420 may perform operation 921 based on a set period. For example, the processor 420 may perform operation 921 based on a preset clock period. For example, the processor 420 may perform operation 921 in every clock period. As another example, the processor 420 may perform operation 921 at various given clock periods, such as every second clock period, every third clock period, or every fourth clock period.

Figure 10A:
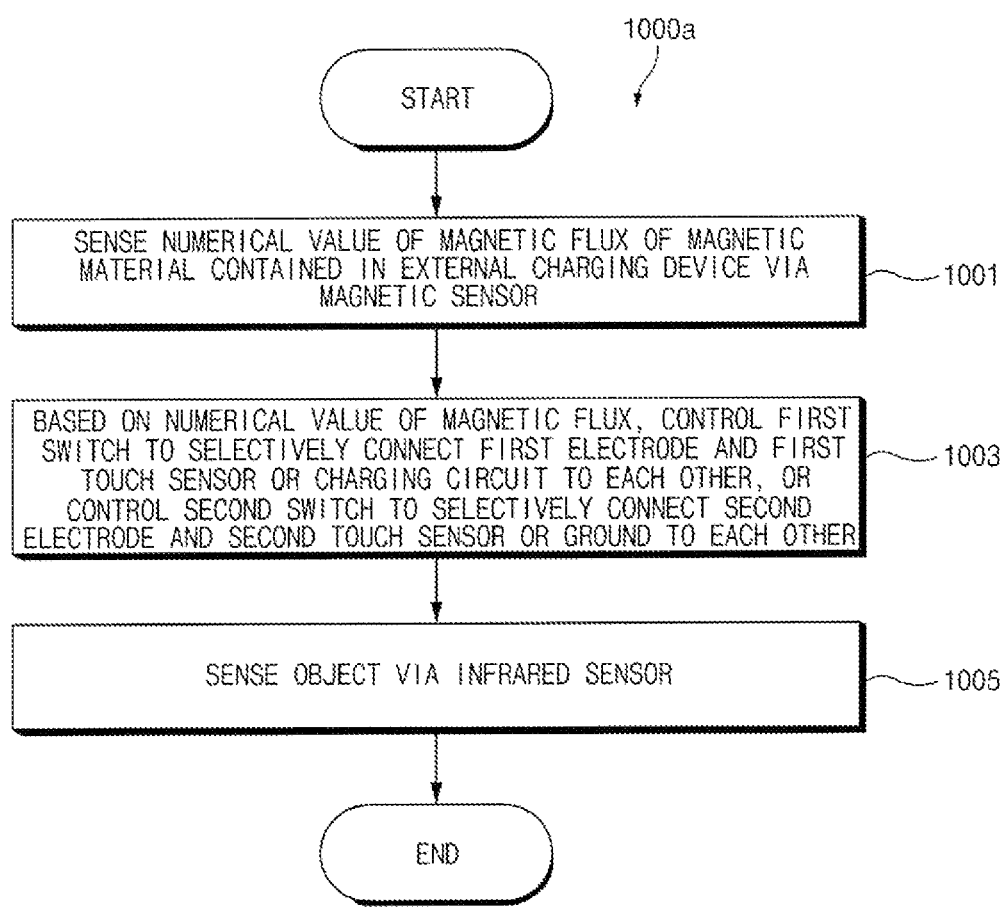
FIG. 10A is a flowchart of a first wireless audio device including an infrared sensor, a first switch, and a second switch according to an embodiment of the disclosure.

FIG. 10A is a flowchart 1000a of a first wireless audio device (e.g., the first wireless audio device 402 in FIG. 6A) including an infrared sensor (e.g., the infrared sensor 441 in FIG. 6A), a first switch (e.g., the first switch 450 in FIG. 6A), and a second switch (e.g., the second switch 460 in FIG. 6A) according to an embodiment of the disclosure.

Referring to FIG. 10A, in operation 1001, the processor 420 (e.g., the processor 420 in FIG. 6A) may sense the numerical value of the magnetic flux of the magnetic material contained in the external charging device via a magnetic sensor (e.g., the magnetic sensor 443 in FIG. 6A).

In operation 1003, based on the numerical value of the magnetic flux, the processor 420 may control the first switch 450 to selectively connect a first electrode (e.g., the first electrode 481 in FIG. 6A) and a first touch sensor (e.g., the first touch sensor 413 in FIG. 6A) or the charging circuit 488 to each other, and control the second switch 460 to selectively connect a second electrode (e.g., the second electrode 483 in FIG. 6A) and the second touch sensor 415 (e.g., the second touch sensor 415 in FIG. 6A) or the ground to each other. In operation 1005, the processor 420 may sense the object via the infrared sensor 441.

Figure 10B:
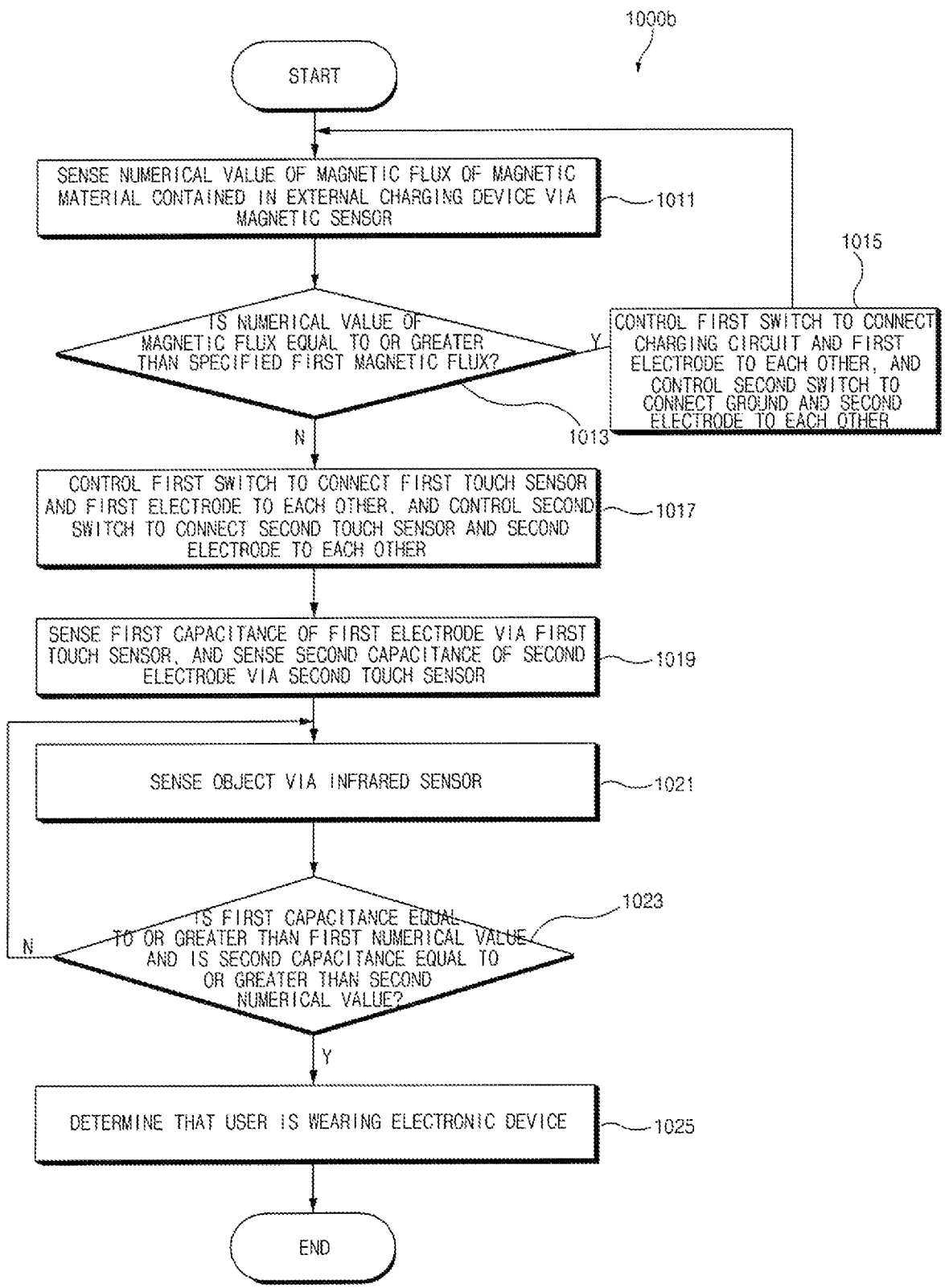
FIG. 10B is a flowchart illustrating a more specific implementation of the operations shown in FIG. 10A according to an embodiment of the disclosure.

FIG. 10B is a flowchart 1000b illustrating a more specific implementation of the operations shown in FIG. 10A according to an embodiment of the disclosure. Referring to FIG. 10B, in operation 1011, the processor 420 (e.g., the processor 420 in FIG. 6A) may sense the numerical value of the magnetic flux of the magnetic material contained in the external charging device via a magnetic sensor (e.g., the magnetic sensor 443 in FIG. 6A).

When the numerical value of the magnetic flux sensed by the processor 420 is equal to or greater than a specified first magnetic flux (e.g., the specified first magnetic flux in FIG. 6A) (operation 1013-Y), the processor 420 may perform operation 1015. In operation 1015, the processor 420 control a first switch (e.g., the first switch 450 in FIG. 6A) to connect a charging circuit (e.g., the charging circuit 488 in FIG. 6A) and a first electrode (e.g., the first electrode 481 in FIG. 6A) to each other, and control a second switch (e.g., the second switch 460 in FIG. 6A) to connect the ground and a second electrode (e.g., the second electrode 483 in FIG. 6A) to each other. The processor 420 may receive the power from the external charging device via the first electrode 481 connected to the electrode of the external charging device to charge the first wireless audio device 402.

When the numerical value of the magnetic flux sensed by the processor 420 is smaller than the specified first magnetic flux (operation 1013-N), the processor 420 may perform operation 1017. In operation 1017, the processor 420 may control the first switch 450 to connect a first touch sensor (e.g., the first touch sensor 413 in FIG. 6A) and the first electrode 481 to each other, and control the second switch 460 to connect the second touch sensor 415 (e.g., the second touch sensor 415 in FIG. 6A) and the second electrode 483 to each other.

In operation 1019, the processor 420 may sense the first capacitance of the first electrode 481 via the first touch sensor 413, and sense the second capacitance of the second electrode 483 via the second touch sensor 415. In operation 1021, the processor 420 may sense the object via an infrared sensor (e.g., the infrared sensor 441 in FIG. 6A).

In operation 1023, the processor 420 may determine whether the first capacitance is equal to or greater than a first numerical value (e.g., the first numerical value in FIG. 6A) and whether the second capacitance is equal to or greater than a second numerical value (e.g., the second numerical value in FIG. 6A).

When the processor 420 determines that the first capacitance is equal to or greater than the first numerical value and the second capacitance is equal to or greater than the second numerical value (operation 1023-Y), the processor 420 may perform operation 1025. In operation 1025, the processor 420 may determine that the user is wearing an electronic device (e.g., the wireless audio device 204 in FIG. 2).

When the processor 420 determines that the first capacitance is smaller than the first numerical value or the second capacitance is smaller than the second numerical value (operations 1023-N), the processor 420 may perform operations again from operation 1021.

The processor 420 may perform operations 1021-1023 based on a set period. For example, the processor 420 may perform operations 1021-1023 based on a preset clock period. For example, the processor 420 may perform operations 1021-1023 in every clock period. As another example, the processor 420 may perform operations 1021-1023 at various given clock periods, such as every second clock period, every third clock period, or every fourth clock period.

An electronic device (e.g., the first wireless audio device 402 in FIG. 4A) includes a housing (e.g., the housing 10 in FIG. 3A), a memory (e.g., the memory 430 in FIG. 4A), the first electrode (e.g., the first electrode 481 in FIG. 4A) and the second electrode (e.g., the second electrode 483 in FIG. 4A) disposed in the housing, a charging circuit (e.g., the charging circuit 488 in FIG. 4A) configured to receive power from an external charging device, a first touch sensor (e.g., the first touch sensor 413 in FIG. 4A), a magnetic sensor (e.g., the magnetic sensor 443 in FIG. 4A), a first switch (e.g., the first switch 450 in FIG. 4A), and a processor 420 (e.g., the processor 420 in FIG. 4A) electrically connected to the memory 430, the first electrode 481, the second electrode 483, the charging circuit 488, the first touch sensor 413, the magnetic sensor, and the first switch 450, the memory 430 stores instructions that, when executed, cause the processor 420 to sense a numerical value of a magnetic flux of a magnetic material contained in the external charging device via the magnetic sensor, and control the first switch 450 to selectively connect the first electrode 481 and the first touch sensor 413 or the charging circuit 488 to each other based on the numerical value of the magnetic flux.

When executed, the instructions may cause the processor to control the first switch 450 to connect the first touch sensor 413 and the first electrode 481 to each other when the numerical value (e.g., the specified first magnetic flux in FIG. 4A) of the magnetic flux is smaller than a specified first magnetic flux or is 0, sense a first capacitance of the first electrode 481 via the first touch sensor 413, and determine whether a user is wearing the electronic device 402 based on the first capacitance.

When executed, the instructions may cause the processor 420 to determine that the user is wearing the electronic device 402 when the first capacitance is equal to or greater than a first numerical value (e.g., the first numerical value in FIG. 4A), and determine that the user is not wearing the electronic device 402 when the first capacitance is smaller than the first numerical value.

When executed, the instructions may cause the processor 420 to control the first switch 450 to connect the first electrode 481 and the charging circuit 488 to each other when the numerical value of the magnetic flux is equal to or greater than a specified first magnetic flux, and charge the electronic device 402 with the power received from the external charging device via the first electrode 481. The electronic device 402 may further include an infrared sensor (e.g., the infrared sensor 441 in FIG. 4C) disposed in the housing, and when executed, the instructions may cause the processor 420 to sense an object via the infrared sensor 441.

When executed, the instructions may cause the processor 420 to determine that a user is wearing the electronic device 402 when the object is sensed and a first capacitance is equal to or greater than a first numerical value, and determine that the user is not wearing the electronic device 402 when the object is not sensed or the first capacitance is smaller than the first numerical value.

The electronic device 402 may further include a second touch sensor (e.g., the second touch sensor 415 in FIG. 5A), and a second switch 460, and when executed, the instructions cause the processor 420 to control the second switch 460 to selectively connect the second electrode 483 and the second touch sensor 415 or a ground to each other, and sense a second capacitance of the second electrode 483 via the second touch sensor 415.

When executed, the instructions cause the processor 420 to control the first switch 450 to connect the charging circuit 488 and the first electrode 481 to each other and control the second switch 460 to connect the ground and the second electrode 483 to each other when the numerical value of the magnetic flux is equal to or greater than a specified first magnetic flux, and control the first switch 450 to connect the first touch sensor 413 and the first electrode 481 to each other and control the second switch 460 to connect the second touch sensor 415 and the second electrode 483 to each other when the numerical value of the magnetic flux is smaller than the specified first magnetic flux or is 0.

When executed, the instructions cause the processor 420 to determine that a user is wearing the electronic device 402 when a first capacitance is equal to or greater than a first numerical value and the second capacitance is equal to or greater than a second numerical value (e.g., the second numerical value in FIG. 5A), and determine that the user is not wearing the electronic device 402 when the first capacitance is smaller than the first numerical value or the second capacitance is smaller than the second numerical value.

The electronic device 402 may further include an infrared sensor 441 disposed in the housing, and when executed, the instructions may cause the processor 420 to sense an object via the infrared sensor 441.

When executed, the instructions may cause the processor 420 to determine that a user is wearing the electronic device 402 when the object is sensed, a first capacitance is equal to or greater than a first numerical value, and the second capacitance is equal to or greater than a second numerical value, and determine that the user is not wearing the electronic device 402 when the object is not sensed, the first capacitance is smaller than the first numerical value, or the second capacitance is smaller than the second numerical value.

A method for controlling the electronic device 402 includes sensing a numerical value of a magnetic flux via a magnetic sensor, and controlling the first switch 450 to selectively connect the first electrode 481 and the first touch sensor 413 or the charging circuit 488 to each other based on the numerical value of the magnetic flux.

The controlling of the first switch 450 may include controlling the first switch 450 to connect the first touch sensor 413 and the first electrode 481 to each other when the numerical value of the magnetic flux is smaller than a specified first magnetic flux or is 0, sensing a first capacitance of the first electrode 481 via the first touch sensor 413, and determining whether a user is wearing the electronic device 402 based on the first capacitance.

The determining of whether the user is wearing the electronic device 402 may include determining that the user is wearing the electronic device 402 when the first capacitance is equal to or greater than a first numerical value, and determining that the user is not wearing the electronic device 402 when the first capacitance is smaller than the first numerical value.

The controlling of the first switch 450 may include controlling the first switch 450 to connect the first electrode 481 and the charging circuit 488 to each other when the numerical value of the magnetic flux is equal to or greater than a specified first magnetic flux, and charging the electronic device 402 with power received from an external charging device via the first electrode 481. The determining of whether the user is wearing the electronic device 402 may include sensing an object via the infrared sensor 441 included in the electronic device 402, determining that the user is wearing the electronic device 402 when the object is sensed and a first capacitance is equal to or greater than a first numerical value, and determining that the user is not wearing the electronic device 402 when the object is not sensed or the first capacitance is smaller than the first numerical value.

The method may further include controlling the second switch 460 to selectively connect the second electrode 483 and the second touch sensor 415 or ground to each other based on the numerical value of the magnetic flux.

The method may further include controlling the first switch 450 to connect the charging circuit 488 and the first electrode 481 to each other when the numerical value of the magnetic flux is equal to or greater than a specified first magnetic flux, controlling the second switch 460 to connect the ground and the second electrode 483 to each other when the numerical value of the magnetic flux is equal to or greater than the specified first magnetic flux, controlling the first switch 450 to connect the first touch sensor 413 and the first electrode 481 to each other when the numerical value of the magnetic flux is smaller than the specified first magnetic flux or is 0, and controlling the second switch 460 to connect the second touch sensor 415 and the second electrode 483 to each other when the numerical value of the magnetic flux is smaller than the specified first magnetic flux or is 0.

The method may further include determining that a user is wearing the electronic device 402 when a first capacitance is equal to or greater than a first numerical value and a second capacitance is equal to or greater than a second numerical value, and determining that the user is not wearing the electronic device 402 when the first capacitance is smaller than the first numerical value or the second capacitance is smaller than the second numerical value.

The method may further include sensing an object via the infrared sensor 441 included in the electronic device 402, determining that the user is wearing the electronic device 402 when the object is sensed, the first capacitance is equal to or greater than the first numerical value, and the second capacitance is equal to or greater than the second numerical value, and determining that the user is not wearing the electronic device 402 when the object is not sensed, the first capacitance is smaller than the first numerical value, or the second capacitance is smaller than the second numerical value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
    a housing;
    a memory;
    a first electrode and a second electrode disposed in the housing;
    a charging circuit configured to receive power from an external charging device;
    a first touch sensor;
    a magnetic sensor;
    a first switch; and
    a processor electrically connected to the memory, the charging circuit, the first touch sensor, the magnetic sensor, and the first switch,
    wherein the memory stores instructions that, when executed, cause the processor to:
        sense a numerical value of a magnetic flux of a magnetic material contained in the external charging device via the magnetic sensor; and
        control the first switch to selectively connect the first electrode and the first touch sensor or the charging circuit to each other based on the numerical value of the magnetic flux,
    wherein when executed, the instructions cause the processor to:
        control the first switch to connect the first touch sensor and the first electrode to each other when the numerical value of the magnetic flux is smaller than a specified first magnetic flux;

sense a first capacitance of the first electrode via the first touch sensor; and
determine whether a user is wearing the electronic device based on the first capacitance.

2. The electronic device of claim 1, wherein when executed, the instructions cause the processor to:
determine that the user is wearing the electronic device when the first capacitance is equal to or greater than a first numerical value; and
determine that the user is not wearing the electronic device when the first capacitance is smaller than the first numerical value.

3. The electronic device of claim 1, wherein when executed, the instructions cause the processor to:
control the first switch to connect the first electrode and the charging circuit to each other when the numerical value of the magnetic flux is equal to or greater than a specified first magnetic flux; and
charge the electronic device with the power received from the external charging device via the first electrode.

4. The electronic device of claim 1, further comprising:
an infrared sensor disposed in the housing,
wherein when executed, the instructions cause the processor to sense an object via the infrared sensor.

5. The electronic device of claim 4, wherein when executed, the instructions cause the processor to:
determine that a user is wearing the electronic device when the object is sensed and a first capacitance is equal to or greater than a first numerical value; and
determine that the user is not wearing the electronic device when the object is not sensed or the first capacitance is smaller than the first numerical value.

6. The electronic device of claim 1, further comprising:
a second touch sensor; and
a second switch,
wherein when executed, the instructions cause the processor to:
control the second switch to selectively connect the second electrode and the second touch sensor or a ground to each other; and
sense a second capacitance of the second electrode via the second touch sensor.

7. The electronic device of claim 6, wherein when executed, the instructions cause the processor to:
control the first switch to connect the charging circuit and the first electrode to each other and control the second switch to connect the ground and the second electrode to each other when the numerical value of the magnetic flux is equal to or greater than a specified first magnetic flux; and
control the first switch to connect the first touch sensor and the first electrode to each other and control the second switch to connect the second touch sensor and the second electrode to each other when the numerical value of the magnetic flux is smaller than the specified first magnetic flux.

8. The electronic device of claim 6, wherein when executed, the instructions cause the processor to:
determine that a user is wearing the electronic device when a first capacitance is equal to or greater than a first numerical value and the second capacitance is equal to or greater than a second numerical value; and
determine that the user is not wearing the electronic device when the first capacitance is smaller than the first numerical value or the second capacitance is smaller than the second numerical value.

9. The electronic device of claim 6, further comprising:
an infrared sensor disposed in the housing,
wherein when executed, the instructions cause the processor to sense an object via the infrared sensor.

10. The electronic device of claim 9, wherein when executed, the instructions cause the processor to:
determine that a user is wearing the electronic device when the object is sensed, a first capacitance is equal to or greater than a first numerical value, and the second capacitance is equal to or greater than a second numerical value; and
determine that the user is not wearing the electronic device when the object is not sensed, the first capacitance is smaller than the first numerical value, or the second capacitance is smaller than the second numerical value.

11. A method for controlling an electronic device, the method comprising:
sensing a numerical value of a magnetic flux via a magnetic sensor; and
controlling a first switch to selectively connect a first electrode and a first touch sensor or a charging circuit to each other based on the numerical value of the magnetic flux,
wherein the controlling of the first switch comprises:
controlling the first switch to connect the first touch sensor and the first electrode to each other when the numerical value of the magnetic flux is smaller than a specified first magnetic flux;
sensing a first capacitance of the first electrode via the first touch sensor; and
determining whether a user is wearing the electronic device based on the first capacitance.

12. The method of claim 11, wherein the determining of whether the user is wearing the electronic device further comprises:
determining that the user is wearing the electronic device when the first capacitance is equal to or greater than a first numerical value; and
determining that the user is not wearing the electronic device when the first capacitance is smaller than the first numerical value.

13. The method of claim 11, wherein the controlling of the first switch further comprises:
controlling the first switch to connect the first electrode and the charging circuit to each other when the numerical value of the magnetic flux is equal to or greater than a specified first magnetic flux; and
charging the electronic device with power received from an external charging device via the first electrode.

14. The method of claim 11, wherein the determining of whether the user is wearing the electronic device further comprises:
sensing an object via an infrared sensor included in the electronic device;
determining that the user is wearing the electronic device when the object is sensed and a first capacitance is equal to or greater than a first numerical value; and
determining that the user is not wearing the electronic device when the object is not sensed or the first capacitance is smaller than the first numerical value.

15. The method of claim 11, further comprising:
controlling a second switch to selectively connect a second electrode and a second touch sensor or ground to each other based on the numerical value of the magnetic flux.

16. The method of claim 15, further comprising:
controlling the first switch to connect the charging circuit and the first electrode to each other when the numerical value of the magnetic flux is equal to or greater than a specified first magnetic flux;
controlling the second switch to connect the ground and the second electrode to each other when the numerical value of the magnetic flux is equal to or greater than the specified first magnetic flux;
controlling the first switch to connect the first touch sensor and the first electrode to each other when the numerical value of the magnetic flux is smaller than the specified first magnetic flux; and
controlling the second switch to connect the second touch sensor and the second electrode to each other when the numerical value of the magnetic flux is smaller than the specified first magnetic flux.

17. The method of claim 15, further comprising:
determining that a user is wearing the electronic device when a first capacitance is equal to or greater than a first numerical value and a second capacitance is equal to or greater than a second numerical value; and
determining that the user is not wearing the electronic device when the first capacitance is smaller than the first numerical value or the second capacitance is smaller than the second numerical value.

18. The method of claim 15, further comprising:
sensing an object via an infrared sensor included in the electronic device;
determining that a user is wearing the electronic device when the object is sensed, a first capacitance is equal to or greater than a first numerical value, and a second capacitance is equal to or greater than a second numerical value; and
determining that the user is not wearing the electronic device when the object is not sensed, the first capacitance is smaller than the first numerical value, or the second capacitance is smaller than the second numerical value.

* * * * *